(12) United States Patent
Prichard

(10) Patent No.: US 8,220,349 B2
(45) Date of Patent: Jul. 17, 2012

(54) TELESCOPING LINEAR ACTUATOR

(75) Inventor: James Bryan Prichard, Dardenne Prairie, MO (US)

(73) Assignee: Innoventor, Inc., St. Louis, MO (US)

( * ) Notice: Subject to any disclaimer, the term of this patent is extended or adjusted under 35 U.S.C. 154(b) by 780 days.

(21) Appl. No.: 12/259,651

(22) Filed: Oct. 28, 2008

(65) Prior Publication Data

US 2009/0107269 A1    Apr. 30, 2009

Related U.S. Application Data

(60) Provisional application No. 60/984,262, filed on Oct. 31, 2007.

(51) Int. Cl.
*F16H 25/02* (2006.01)
(52) U.S. Cl. .............. 74/89.35; 74/89.27; 74/89.28
(58) Field of Classification Search .............. 74/89.35, 74/89.34, 89.23, 89.27, 89.28
See application file for complete search history.

(56) References Cited

U.S. PATENT DOCUMENTS

| | | | | |
|---|---|---|---|---|
| 873,248 A | * | 12/1907 | Lagasse et al. | 254/102 |
| 1,379,012 A | * | 5/1921 | Gibbard | 254/102 |
| 1,389,737 A | * | 9/1921 | Burrows | 254/102 |
| 1,441,963 A | * | 1/1923 | Bullis | 254/102 |
| 2,096,022 A | | 10/1937 | Akins | |
| 2,409,288 A | * | 10/1946 | Leland | 74/89.4 |
| 2,420,364 A | * | 5/1947 | Espenas | 403/48 |
| 3,559,499 A | | 2/1971 | Profet | |
| 3,576,135 A | | 4/1971 | Tschunko | |
| 3,592,070 A | | 7/1971 | Hammond | |
| 3,727,472 A | | 4/1973 | Maekawa | |
| 3,751,998 A | | 8/1973 | Vasilatos | |
| 4,062,156 A | | 12/1977 | Roth | |
| 4,651,581 A | * | 3/1987 | Svensson | 74/89.35 |
| 4,793,197 A | | 12/1988 | Petrovsky | |
| 4,807,855 A | | 2/1989 | Schuitema | |
| 5,043,542 A | | 8/1991 | McCombs et al. | |
| 5,116,004 A | | 5/1992 | Luecke | |
| 5,313,852 A | * | 5/1994 | Arena | 74/89.35 |
| 5,553,550 A | | 9/1996 | Doyle | |
| 5,660,495 A | | 8/1997 | Atsukawa | |
| 5,733,096 A | | 3/1998 | Van Doren et al. | |
| 5,868,032 A | | 2/1999 | Laskey | |
| 6,026,970 A | | 2/2000 | Sturm, Jr. et al. | |
| 6,101,889 A | | 8/2000 | Laskey | |
| 6,352,037 B1 | | 3/2002 | Doyle | |
| 6,435,048 B1 | | 8/2002 | Zimmerman | |

(Continued)

OTHER PUBLICATIONS

International Search Report of PCT/US2008/081519; Dec. 15, 2008; 9 pages.

(Continued)

*Primary Examiner* — William C Joyce
*Assistant Examiner* — Terence Boes
(74) *Attorney, Agent, or Firm* — Armstrong Teasdale LLP

(57) ABSTRACT

A telescoping actuator is described which provides a first and third segments operatively connected to a second segment. A locking system locks the first and third segment in rotation with respect to one another. Upon rotation of the second segment, the first and third segments are displaced relative to one another and the second segment. The first and third segments are operatively coupled to the second segment by corresponding sets of threads in some embodiments. The locking system may be interlocking tubes, or shafts displaced internal to the actuator. Rotational energy may be imparted to the second stage externally about its outer diameter or internally by a driveshaft operatively connected to a drive source.

14 Claims, 23 Drawing Sheets

U.S. PATENT DOCUMENTS

| | | |
|---|---|---|
| 6,494,005 B2 | 12/2002 | Zimmerman |
| 6,595,144 B1 | 7/2003 | Doyle |
| 6,711,985 B1 | 3/2004 | Doyle |
| 6,772,653 B1 | 8/2004 | Franksson |
| 6,880,416 B2 | 4/2005 | Koch |
| 6,880,424 B2 | 4/2005 | McMillen |
| 7,124,864 B2 | 10/2006 | Jones et al. |
| 7,185,868 B2 | 3/2007 | Wang |
| 7,225,694 B2 | 6/2007 | Said |
| 2003/0183027 A1 | 10/2003 | Koch |
| 2004/0173041 A1 | 9/2004 | Said |

OTHER PUBLICATIONS

European Search Report regarding Application No. 08845552.2 mailed on Jul. 15, 2011; 9 pages.

* cited by examiner

TELESCOPING LINEAR ACTUATOR

CROSS REFERENCE TO RELATED APPLICATIONS

This application claims priority to U.S. Provisional Patent Application No. 60/984,262 entitled "Methods and Systems for Fabricating a Telescoping Actuator", filed Oct. 31, 2007. The disclosure of said application is incorporated by reference in its entirety.

BACKGROUND OF THE INVENTION

This invention generally relates to linear actuators and lift jacks and, more specifically, to a telescoping linear actuator.

Many industries require that large loads be lifted, moved, or repositioned. Often, the load must be moved a significant distance and then precisely positioned at a new location. Typically the load is moved using an actuator or lift jack. Unfortunately, there is a tradeoff in the amount of space that these systems occupy because when in a collapsed state typical non-telescoping actuators are longer than their stroke. When using the typical non-telescoping actuator, this may result in the actuator taking up more space around the work area than desired. In specific lift jack applications, this may result it being unusable because the lift jack cannot be inserted underneath the load.

Generally, these problems are solved by utilizing telescoping hydraulic rams. These rams and the systems within which they operate are still susceptible to failure, possibly leading to a falling load. Further, precise positioning with telescoping hydraulic rams is difficult unless delicate instruments (e.g., linear variable differential transformers) are placed along an exterior longitudinal axis of the ram to measure its longitudinal displacement. These delicate instruments are often subject to interference or damage when used in rough environments. Accordingly, a loss of confidence in the position of the load and significant safety issues may result from the use of telescoping hydraulic rams.

With respect to previous telescoping linear actuators, a known limitation is that an external force must be applied at the tip of the actuator, usually by a load being lifted, to prevent the stage nearest the tip from turning. If the stage nearest the tip of the actuator turns during deployment, rather than simply extending, the position of the load will not be known. Further, if the load is used to prevent rotation of the tip, significant forces may be introduced to the load that may not be allowable, thereby limiting the application of the actuator. Throughout this application the terms "stage" and "segment" are used interchangeably and should be understood to have the same meaning.

Accordingly, a better solution is needed that does not rely on a force applied by a load to prevent a stage from rotating and permits precise positioning of a load by an actuator that has a high volumetric efficiency.

BRIEF DESCRIPTION OF THE INVENTION

According to a first aspect, a telescoping linear actuator is provided that comprises a first, second, and third segments. The first segment comprises a housing an inner spline shaft. An outer spline shaft is coaxial with the inner spline shaft. The outer spline shaft is tubular and receives at least a portion of the inner spline shaft therein for telescoping movement of the outer shaft relative to the inner shaft. A locking system locks the outer shaft against rotation relative to the inner shaft. A third segment is mounted to the outer spline shaft. The first segment and third segments are in coaxial relationship with the second segment and configured for telescoping axial movement relative to one another.

According to a second aspect, a linear actuator configurable between an unextended configuration and an axially extended configuration has an interior and an exterior. The actuator comprises a first, second, and third longitudinal segments in coaxial relationship with one another and configured for telescoping axial movement relative to one another. A drive system is operable to drive rotation and telescoping axial movement of the second segment relative to the first segment. The third segment is operatively connected to the second segment for telescoping axial movement of the third segment relative to the first and second segments in response to rotation of the second segment. The drive system comprises a drive motor disposed exterior of the actuator and a drive member rotatably driven by the drive motor. The drive member is in operative connection with the second segment to drive rotation of the second segment.

According to a third aspect, a linear actuator is provided that is configurable between an unextended configuration and an axially extended configuration. The actuator comprises: a first, second, and third longitudinal segments in coaxial relationship with one another and configured for telescoping movement relative to one another; a drive system operable to drive rotation and telescoping axial movement of the second segment relative to the first segment, the third segment being operatively connected to the second segment for telescoping axial movement of said third segment relative to the first and second segments in response to rotation of the second segment; and a locking system connecting third segment with the first segment to inhibit rotation of the third segment relative to the first and second segment while permitting telescoping axial movement of the third segment relative to the first and second segments.

In a fourth aspect, a method of operating a telescoping actuator is provided. A first, second, and third segment are in coaxial relationship with one another and configured for telescoping axial movement relative to one another. The second segment is rotated and the third segment is operatively connected to the second segment for telescoping movement of the third segment relative to the first and second segments in response to the rotation of the second segment. The first segment is inhibited from rotation relative to the third segment by other than an external force.

DETAILED DESCRIPTION OF THE INVENTION

The described embodiments provide precise positioning of an actuator by a drive source (e.g., a motor and encoder). The drive source may be placed in a variety of positions relative to the actuator, such as an inline or side-mounted configuration. A plurality of segments (e.g., a first segment and a third segment) are operatively coupled to a drive segment (e.g., a second segment). Further, when the plurality of segments are operatively coupled to the drive segment with ACME or other power transmission threads with a sufficient helix angle, the actuator cannot be driven backward by force applied by a load being lifted by the actuator. In particular, the embodiments are believed to address failure modes or safety concerns that may be present in other systems. Further, the described embodiments are "Green" devices that do not create an ongoing volume of waste oil, etc. Accordingly, the described embodiments can be used in clean environments without giving off pollutants or other emissions.

Additionally, while a center (i.e., second) segment is driven by an external drive source, surrounding segments (i.e., first and third segments) are pushed apart or pulled together about their longitudinal axis by rotation of the center segment. In one embodiment, an external locking system prevents rotation of the surrounding segments relative to the center segment and the load being lifted. Other embodiments provide an internal locking system to prevent the rotation. Accordingly, the surrounding segments do not turn along with the center segment and external force is not required to restrain the rotation of the surrounding segments. A torsional force is therefore not transmitted to a load being lifted by the actuator, and instead remains within the actuator.

The embodiments described herein internalize actuation forces and do not depend on the load or anything outside the actuator to prevent rotation of the segment of the actuator that engages a load. The embodiments may incorporate a screw extension from the third that is hollow to enable nesting when the actuator is in a collapsed state. Further, because rotation of the third segment is internally controlled, the adjustable tip has no tendency to turn during actuation of the mechanism. In one embodiment, the adjustable tip can be locked in fixed position.

Figure 1:
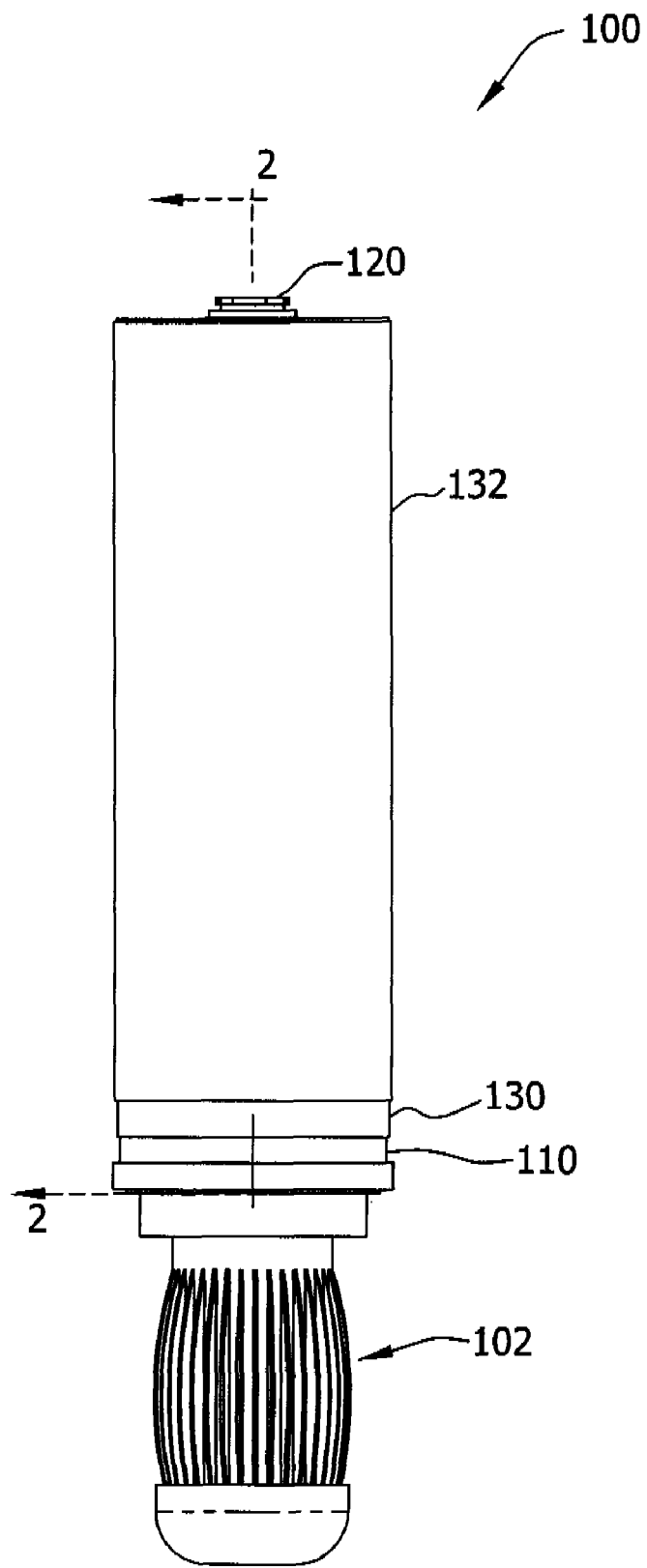
FIG. 1 is a schematic view of an actuator including an inline drive source to an internal drive shaft.

FIGS. 1-7A are schematic views of a first embodiment of the above mentioned actuator. Specifically, FIG. 1 is a schematic view of the first embodiment of an actuator 100 including a drive source in an inline mounting configuration (referred to generally as 102 and depicted as a motor in some embodiments). The drive source is an electric motor in some embodiments, while in other embodiments different types of drive sources are utilized, such as hydraulic motors. Included in the drive source 102 is an encoder (not shown) or other type of position monitoring device. The encoder monitors the rate of rotation and rotational position of an output portion of the drive source 102, thus enabling the precise measurement of the rotational position of a drive shaft 104 (shown in FIGS. 2 and 5) that is coupled to the drive source. By measuring the rotational position of the drive shaft 104, the longitudinal displacement of the actuator 100 may be calculated, as will be discussed in greater detail below.

Figure 2:
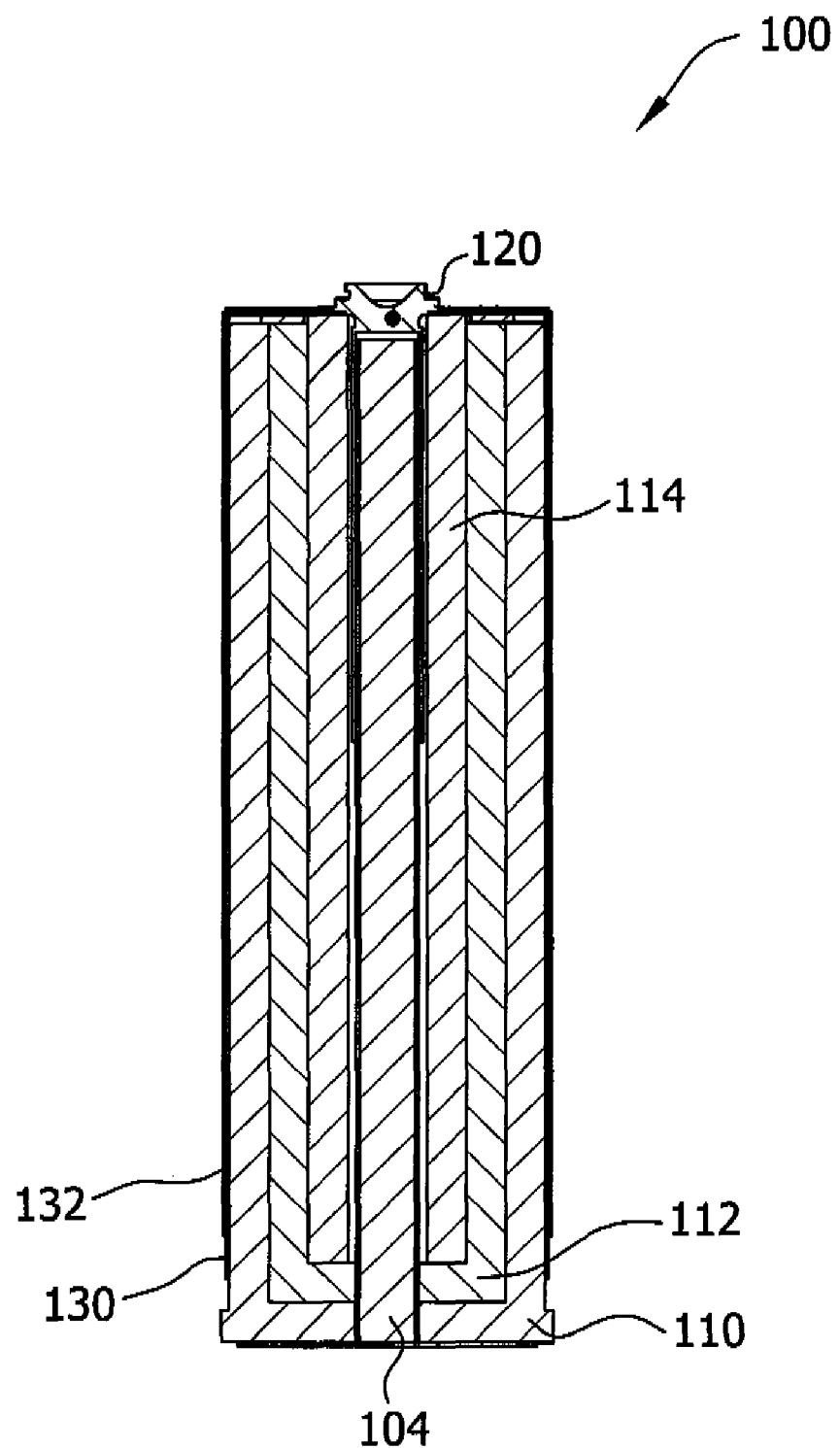
FIG. 2 is a cross-sectional view of the actuator of FIG. 1.
Figure 3:
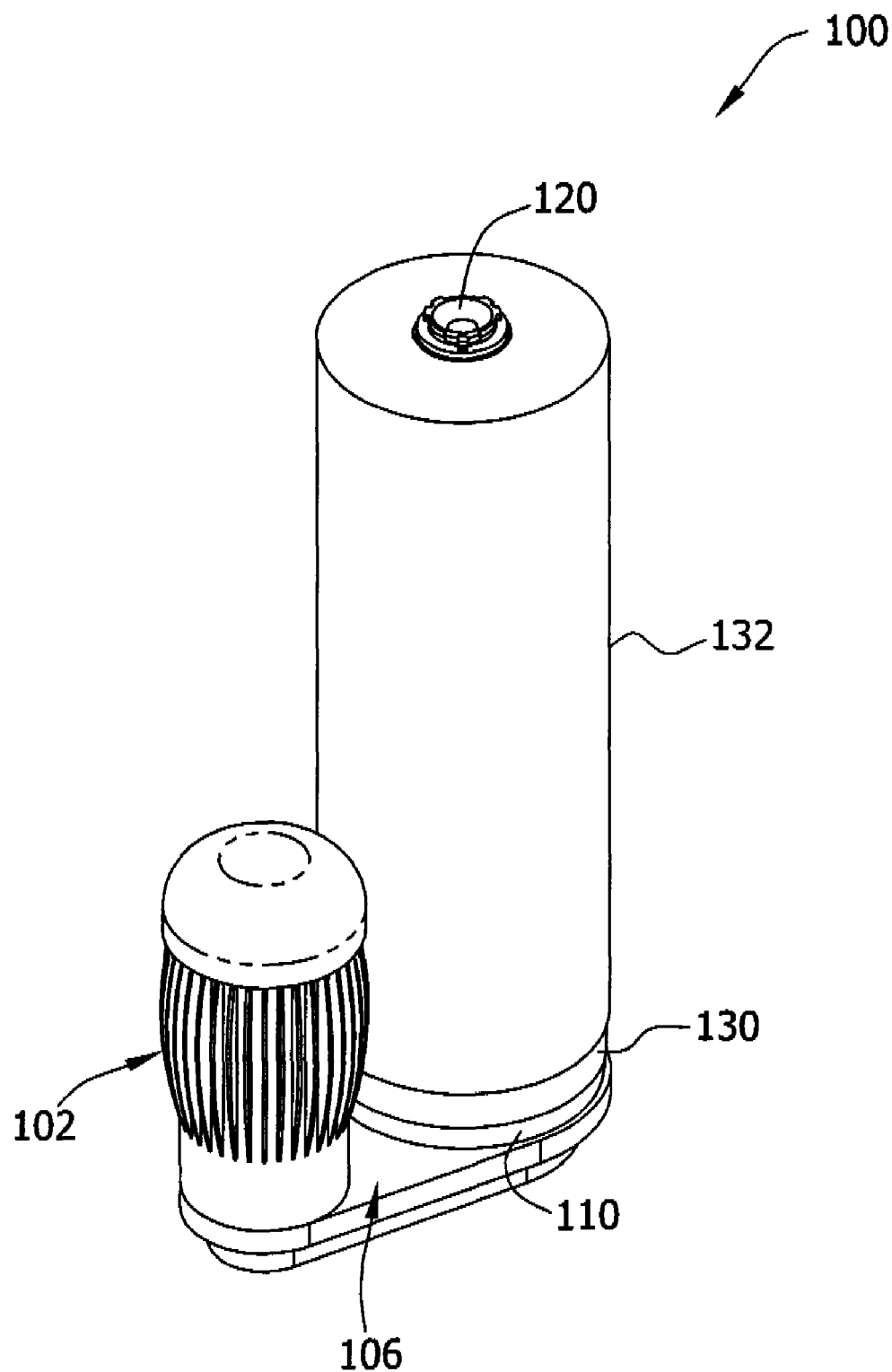
FIG. 3 is a schematic view of the actuator shown in FIG. 1 including a side-mounted drive source.
Figure 4:
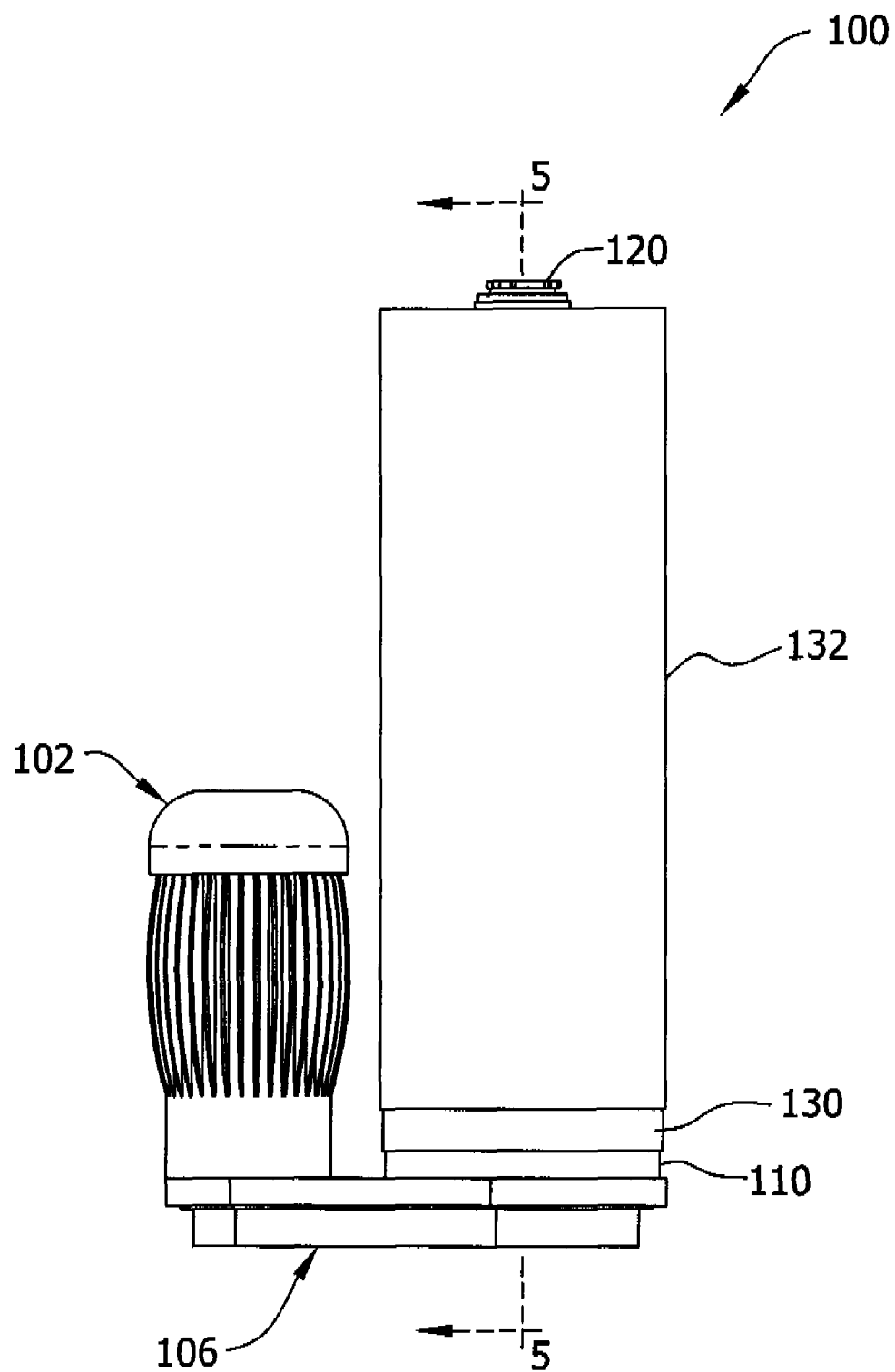
FIG. 4 is a schematic view of an alternative embodiment of an actuator including a side-mounted drive source.
Figure 5:
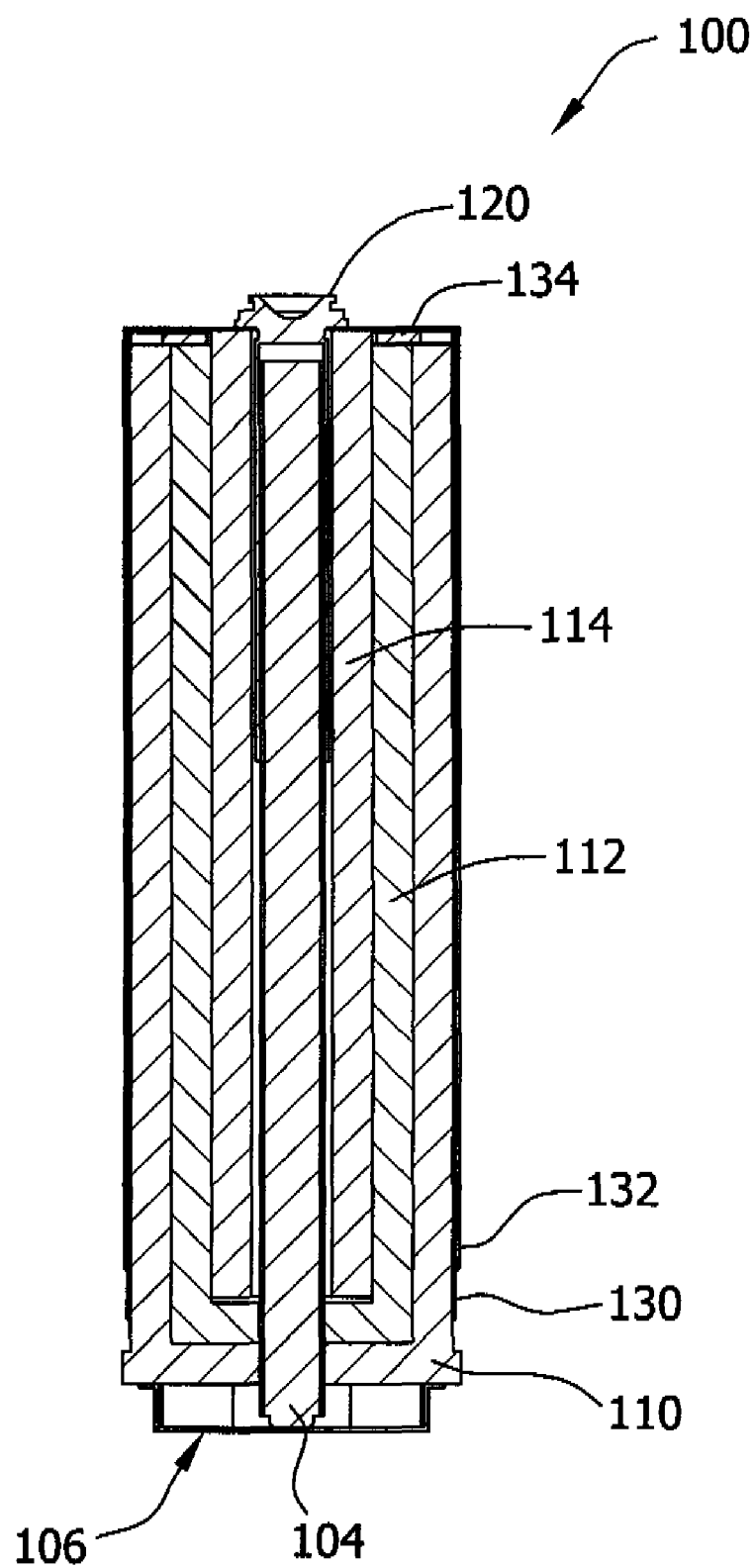
FIG. 5 is a schematic view of the actuator shown in FIG. 4 in an expanded configuration.
Figure 6:
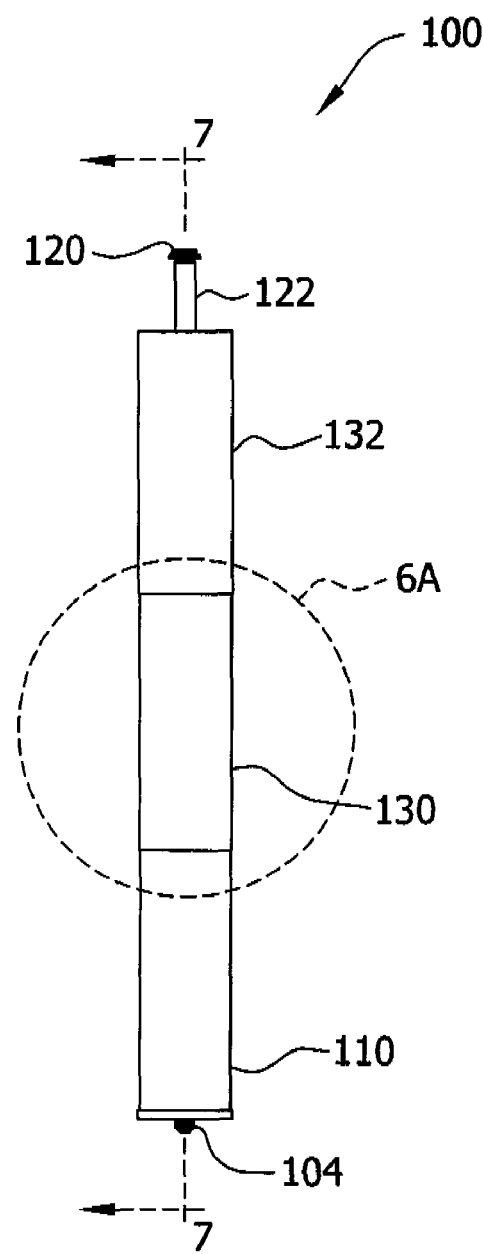
FIG. 6 is another schematic view of the actuator shown in FIG. 4 in the expanded configuration.
Figure 7:
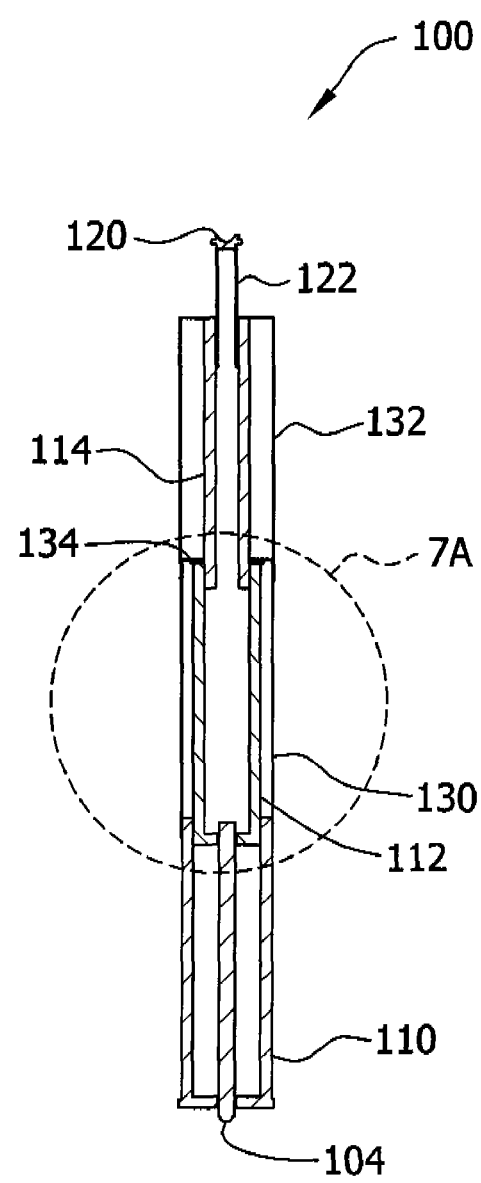
FIG. 7 is a cross-sectional view of the actuator shown in FIG. 6.
Figure 7A:
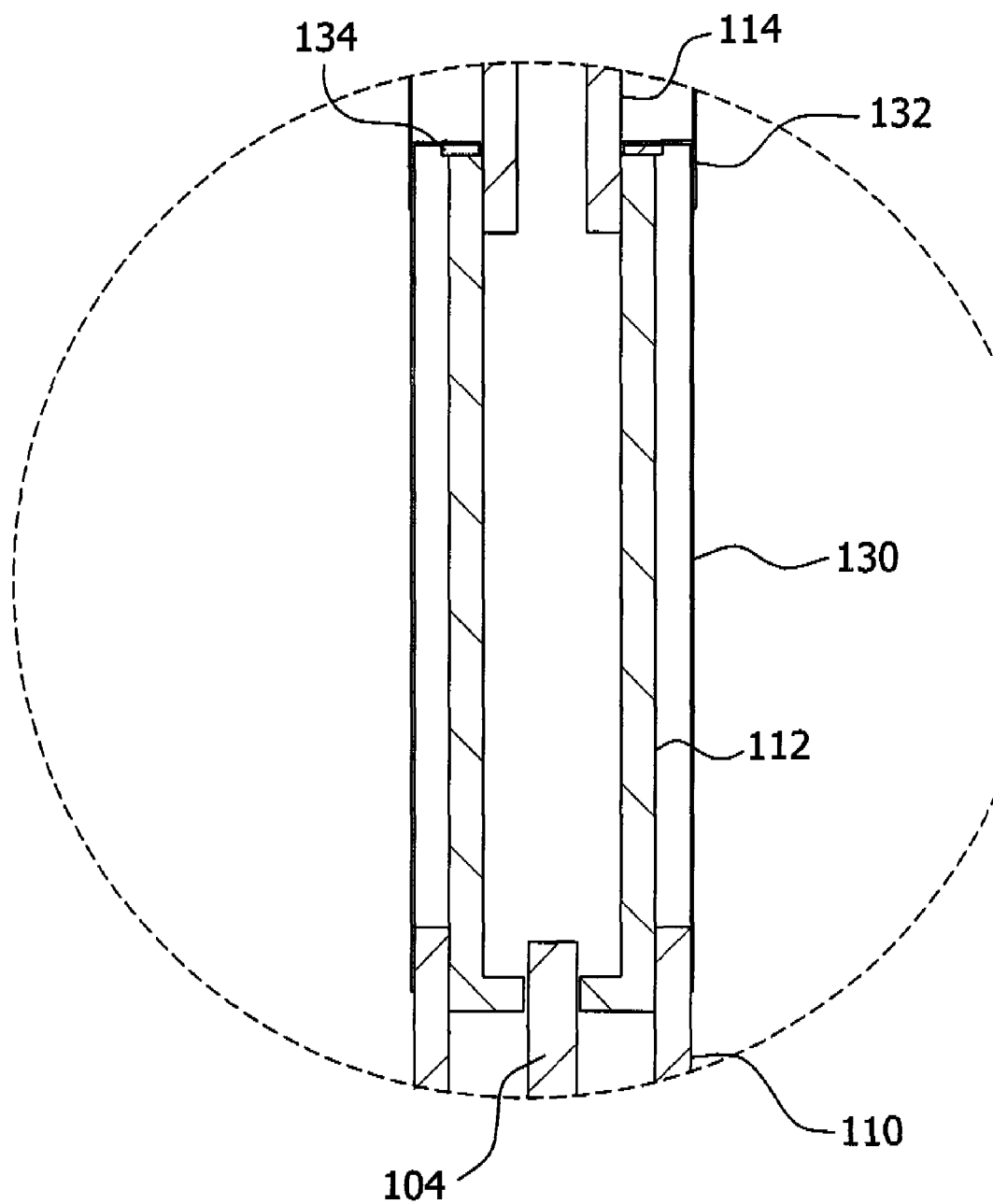
FIG. 7A is an exploded view a portion of the actuator illustrated in FIG. 7.

FIG. 2 is cross-sectional view of FIG. 1 and FIG. 3 is a schematic view of the actuator 100 shown in FIG. 1 where the drive source 102 is in a side-mounted configuration. FIGS. 1-5 illustrate the actuator 100 in an unextended configuration, while FIGS. 6-7A are schematic views of the actuator illustrated in an extended configuration. In the embodiments depicted in FIGS. 3-5, a drive transmission mechanism 106 is utilized to transmit the rotational energy output from the drive source 102 to the drive shaft 104. By way of example only, the drive transmission mechanism 106 can include any combination of gears, chains, pulleys or belts to transmit rotational energy from the drive source 102 to the drive shaft 104. FIGS. 3-5 are schematic views of this alternative actuator 100 embodiment. Specifically, FIG. 3 is a schematic view of an actuator that includes a side mount motor. FIG. 5 is a schematic view of this embodiment in an unextended configuration.

Figure 6A:
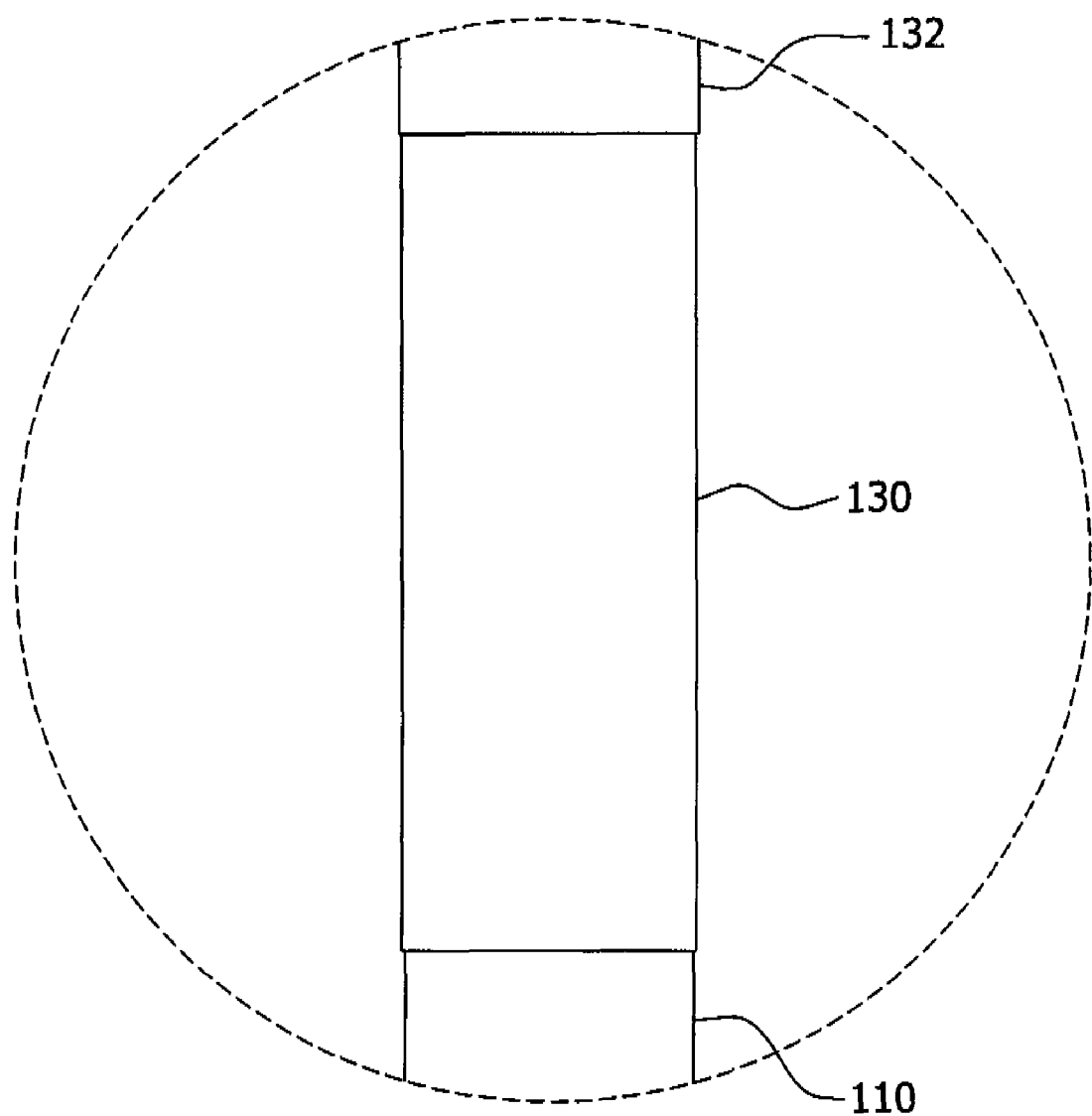
FIG. 6A is an expanded view a portion of the actuator illustrated in FIG. 6.

The embodiment illustrated in FIGS. 1-3 is utilized in applications where the drive source 102 is in-line with the actuator. For example, the first embodiment is preferred when the drive source 102 is to be closer to a proximal end of the actuator 100. Such an embodiment provides an actuator 100 in a narrow cylindrical space. In this embodiment, tubular covers 130 and 132 (i.e., telescoping torque tubes in the form of protective covers) are included over the outside of the actuator 100 assembly that prevent a third segment 114 of the actuator 100 from rotating relative to a base (e.g., a first segment 110). This prevents torsional loads from being introduced into the load being lifted by the actuator 100. A second segment 112 is driven internally by the drive shaft 104 (or telescoping shaft arrangement, depending on stroke of the actuator 100 and other factors) that eliminates movement of the drive source 102 during actuation. Accordingly, the diameter of the second tubular cover 130 is greater than that of the first tubular cover 132, as best shown in FIGS. 6A and 7A.

The drive shaft 104, in some embodiments, may be a telescoping drive shaft. In such an embodiment, an inner telescoping drive shaft is provided that includes at least one segment that transmits torque and extends or retracts freely with respect to a fixed segment in mechanical connection with the drive source 102.

While specific mention will be made herein to the use of a splined connection between the drive shaft 104 and the second segment 112, other mechanisms or systems may be used to couple the drive source 102 and the second segment. For example, the embodiment illustrated in FIGS. 1-7A are also usable with ball screws (not shown), which typically include a nut and a screw. In such embodiments, the drive shaft 104 would form the screw, while the nut would be in connection therewith about its inner diameter and suitably coupled about its outer diameter to the second segment 112, thus preventing rotation of the second segment relative to the nut. As many ball screws are back-drivable, embodiments utilizing one will often employ a brake motor or other suitable device to prevent unintended backwards rotation in case of failure of the drive source 102. In other embodiments, ACME threads or other similar power transmission threads may be formed into the drive shaft 104 and the corresponding nut. ACME and other similar power transmission threads are generally not back-drivable given the proper helix angle, while they are less efficient and costly than ball screws.

The embodiment illustrated in FIGS. 1-3 includes the first segment 110 (i.e., base), the second segment 112 positioned within the first segment, and the third segment 114 positioned within the second segment. Each of the segments 110, 112, and 114 are in coaxial relationship and configured for telescoping axial movement relative to one another and additionally share the same longitudinal axis.

The second segment 112 is operatively coupled to the drive shaft 104 that is positioned radially inward from the third segment 114. The drive shaft 104 is configured to rotate the second segment such that the first 110 and third 114 segments are driven apart or pulled together upon rotation of the second segment. An adjustable tip 120 is positioned at the top of the actuator 100 and is configured to retain the load. In the exemplary embodiment, the adjustable tip 120 is configured to rise with the third segment 114 without rotating. Further, the adjustable tip 120 is hollow to facilitate reducing the collapsed height of the assembly and coupled to a tip extension segment 122 in some embodiments. The adjustable tip and tip extension segment 122 may be restrained from rotation by connection to a second tubular cover, described below.

During operation, the drive shaft 104 rotates in a fixed axial relationship with the first segment 110. The drive shaft 104 is splined or keyed with the second segment 112 such that the second segment rotates in a fixed relationship with the drive shaft 104, while still being free to be axially displaced relative the drive shaft. A variety of mechanisms may be used to connect the drive shaft 104 to the second segment 112, as long as they provide for the transmission of rotational energy to and subsequent rotation of the second segment. The exemplary embodiment provided above is but one method of connecting the drive shaft 104 to the second segment 112.

In the exemplary embodiment, an outer diameter of the second segment 112 has threads that mate with the inner diameter of the first segment 110 causing the second segment to screw in or out of the first segment. The second segment 112 also has threads disposed about its inner diameter that mate with threads formed into the outer diameter of the third segment 114. The threads may be of any suitable type, any formed by any suitable process such as: cutting, rolling, forming, casting, or grinding. The threads formed into the segments are not shown in the Figures for the sake of clarity.

In one embodiment, the threads formed into the outer diameter of the second segment 112 and the inner diameter of the first segment 110 are of the type conventionally referred to as right-handed. In this manner, when the second segment 112 is rotated in a clockwise direction (when viewed from the bottom of the actuator 100) the second segment turns and is displaced longitudinally and away from the bottom of the actuator 100. The threads formed into the inner diameter of the second segment 112 and the outer diameter of the third segment 114 are left-handed threads. As second segment 112 is rotated in a clockwise direction and the third segment is held in a rotationally fixed position (as described in greater detail below), the third segment is displaced longitudinally and away from the bottom of the actuator 100 while the second segment is displaced longitudinally away from the first segment 110.

Other embodiments may utilize left-handed threads at the interface between the first segment 110 and second segment 112 and right-handed threads between the interface of the second segment 112 and the third segment 114. Accordingly, those embodiments turn the drive shaft 104 and second segment 112 in a counter-clockwise direction to extend the actuator 100 and in a clockwise direction to retract that actuator to an unextended position.

In some embodiments, a locking system in the form of tubular covers is provided for preventing rotation of the third segment 114 relative to the first segment 110. The actuator 100 has an interior and an exterior, and the locking system connects the third segment 114 with the first segment 110 within the interior of the actuator.

A first tubular cover 130 (i.e., a tubular second segment cover) is provided in the form of a torque tube that is keyed or splined and cannot rotate relative to the first segment 110. A recess (i.e., a first locking member) is formed along the length of the first tubular cover 130, into which a protrusion (i.e., a second locking member) formed into the outer diameter of the first segment 110 is able to longitudinally slide therein. Accordingly, the first tubular cover 130 is only able to move axially relative to the first segment 110 and cannot rotate.

In some embodiments, a bearing 134 (shown in FIG. 7A) is operatively connected to the second segment 112 enables the second segment to rotate while the first tubular cover 130 only moves axially, while still connecting the second segment and first tubular cover. As the second segment 112 axially displaces relative to the longitudinal axis of first segment 110, the first tubular cover 130 travels longitudinally as well, without rotating. The bearing 134 may suitably be a roller thrust bearing, or more suitably a tapered roller bearing.

In the exemplary embodiment, a second tubular cover 132 (i.e. tubular third segment cover) is provided in the form of a torque tube that cannot rotate relative to the first tubular cover 130 and by that connection cannot rotate relative to the first segment 110. However, the second tubular 132 cover can move axially relative to first tubular cover 130. The second tubular cover 132 is suitably connected to the third segment 114 to prevent rotation of the third segment 114 relative to the second tubular cover. In some embodiments, the second tubular cover 132 has a recess (i.e., a second locking member) formed along its longitudinal axis and a corresponding protrusion (i.e., a first locking member) formed in the outer diameter of the first tubular cover 132, thus permitting longitudinal displacement of the tubular covers 130 and 132 relative to one another while inhibiting rotation of the second tubular cover 132 relative to the first tubular cover 130.

The tubular covers 130 and 132 are therefore effectively clock-locked together, preventing the third segment 114 from rotating relative to the first segment 110. As best shown in FIGS. 6A and 7A, the first tubular cover 130 has a diameter slightly smaller than that of the second tubular cover 132, thus permitting the first tubular cover to be displaced within the second tubular cover when the actuator 100 is an unextended configuration. Additionally, in the exemplary embodiment the tubular covers 130 and 132 function as dust covers, preventing outside contaminants (e.g., dust or dirt) from coming into contact with the segments 110, 112, and 114 and the threads formed therein.

As described above, the drive source 102 includes an encoder that accurately measures the rotational displacement (i.e., number of revolutions or fractions thereof) of the drive source. In embodiments utilizing a drive source 102 mounted inline with the actuator 100, the drive shaft 104 will often be coupled directly to the drive source, resulting in a 1:1 ratio of rotation between the two. However, a gear reduction mechanism may be employed in some embodiments and consequently the appropriate reduction ratio can be easily determined. In embodiments where the drive source 102 is in a side-mounted configuration, a drive transmission mechanism 106 is utilized to transmit rotation energy to the drive shaft 104 and the appropriate gear reduction ratios can be determined.

Accordingly, the ratio of the number of revolutions of the drive source 102 relative to the drive shaft 104 is easily determined. As the pitch of the threads coupling the first segment 110 to second segment 112 and the third segment 114 to the second segment are known, the linear displacement of the segments can be calculated given the number of revolutions of the drive shaft 104. The resolution of commercially available encoders is often in the range of thousands of distinct increments per revolution, thus permitting accurate determination of the longitudinal displacement of the actuator 100 during and after rotation of the second segment 112. Additionally, the encoder may be used in a feedback control loop to control the operation of the drive source 102.

Referring now to FIGS. 8-22, another embodiment is presented wherein the locking system includes telescoping, splined shafts positioned in the interior of the actuator and configured to lock the first 110 and third 114 segments together, thereby preventing relative rotation between the first and third segments. In this embodiment, the drive source 102 drives the exterior of the second segment 112 through one or more gears, sprockets, pulleys, belts or chains (referred to generally as transmission system 108 or more generally as "drive member"). In this embodiment, an external mounting flange 111 is connected to at least a portion of the first segment 110 to aid in affixing the actuator to another device. The external mounting flange 111 may be connected to the actuator by any suitable connection method, such as welding.

Figure 8:
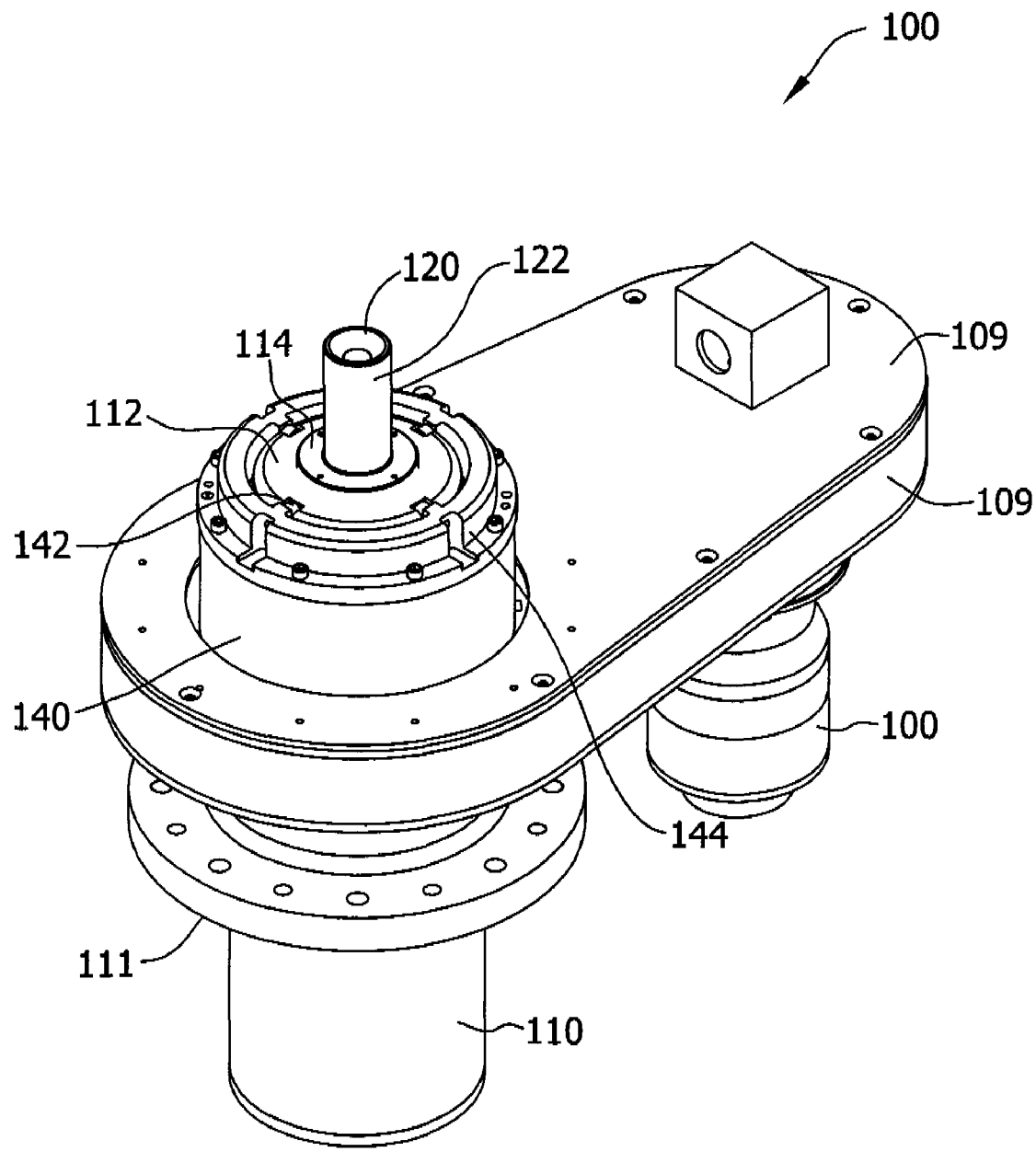
FIG. 8 is a perspective view of a telescoping linear actuator in an axially extended position.
Figure 9:
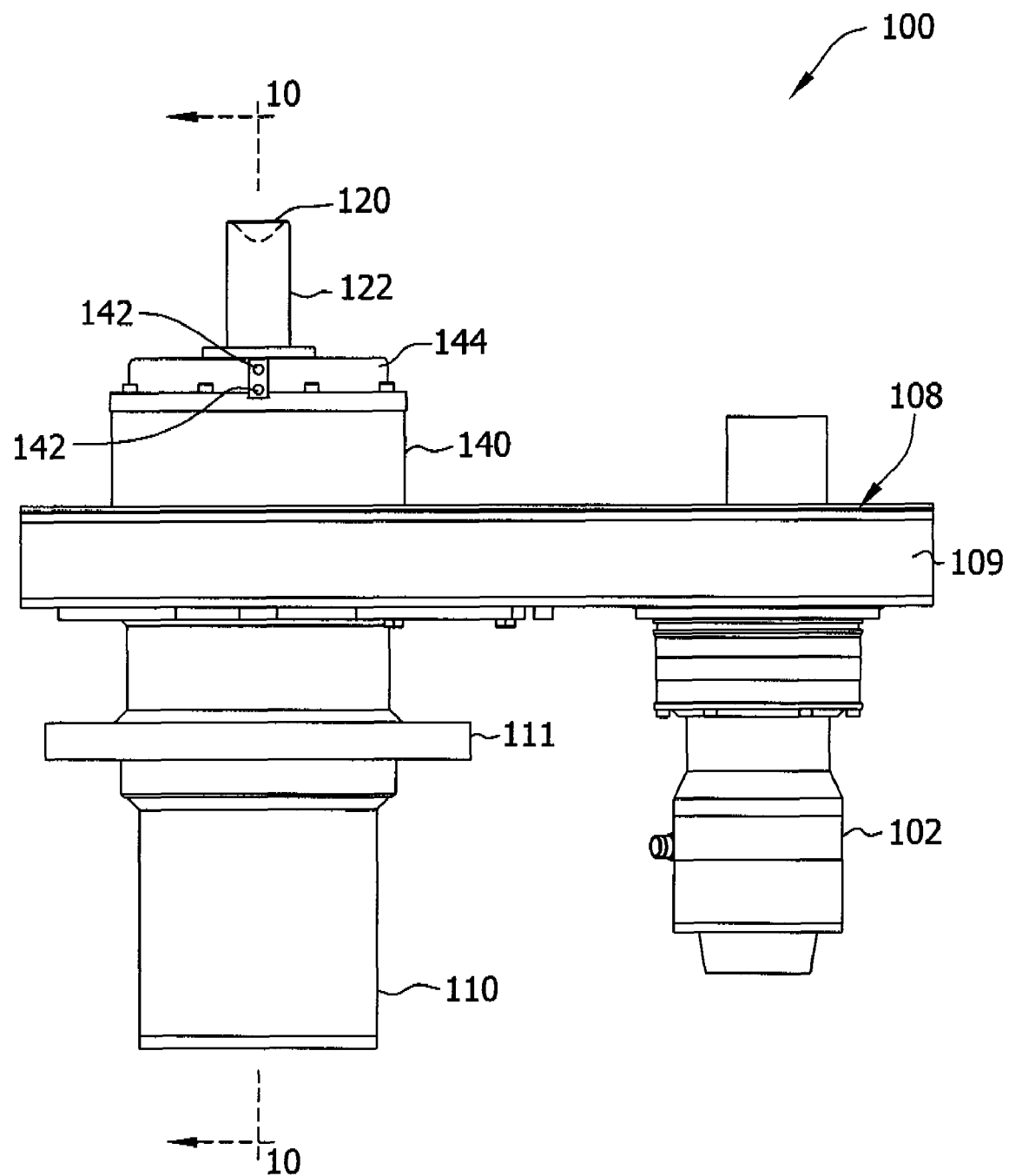
FIG. 9 is a side view of the telescoping linear actuator in a axially extended position.
Figure 10:
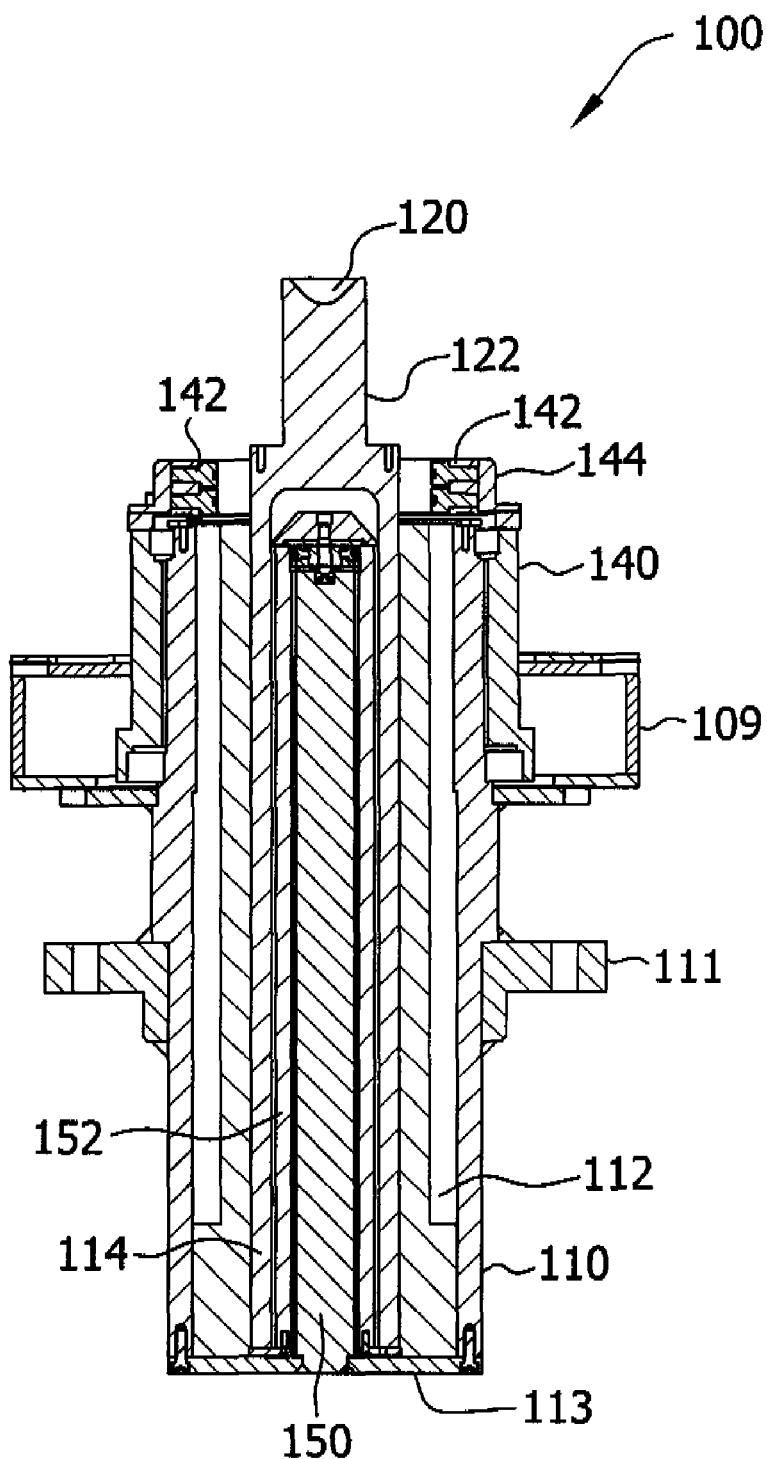
FIG. 10 is a cross-sectional view of the telescoping linear actuator of FIG. 9.
Figure 11:
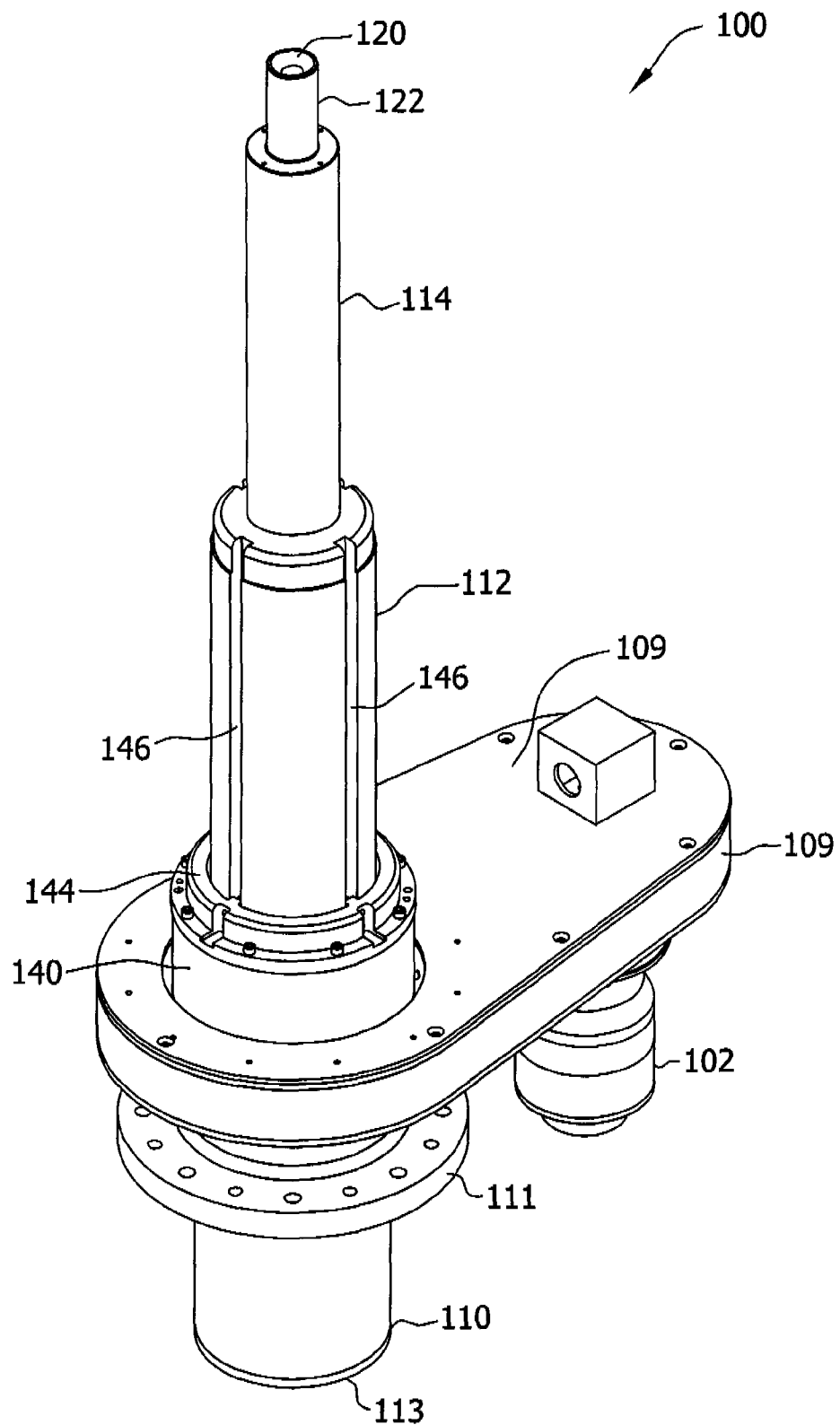
FIG. 11 a perspective view of a telescoping linear actuator in an axially extended position.
Figure 12:
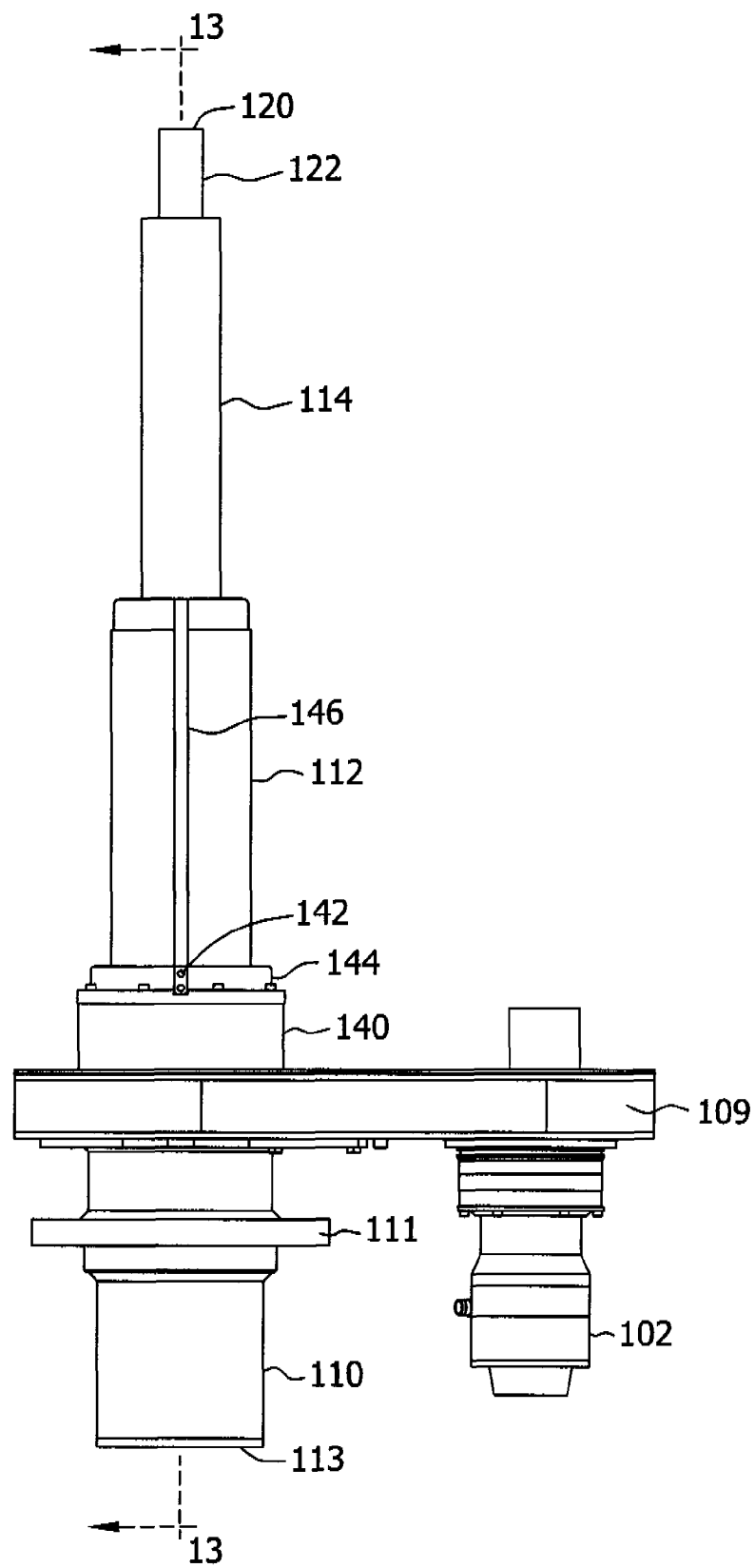
FIG. 12 is a cross-sectional view of the telescoping linear actuator in an axially extended position.
Figure 13:
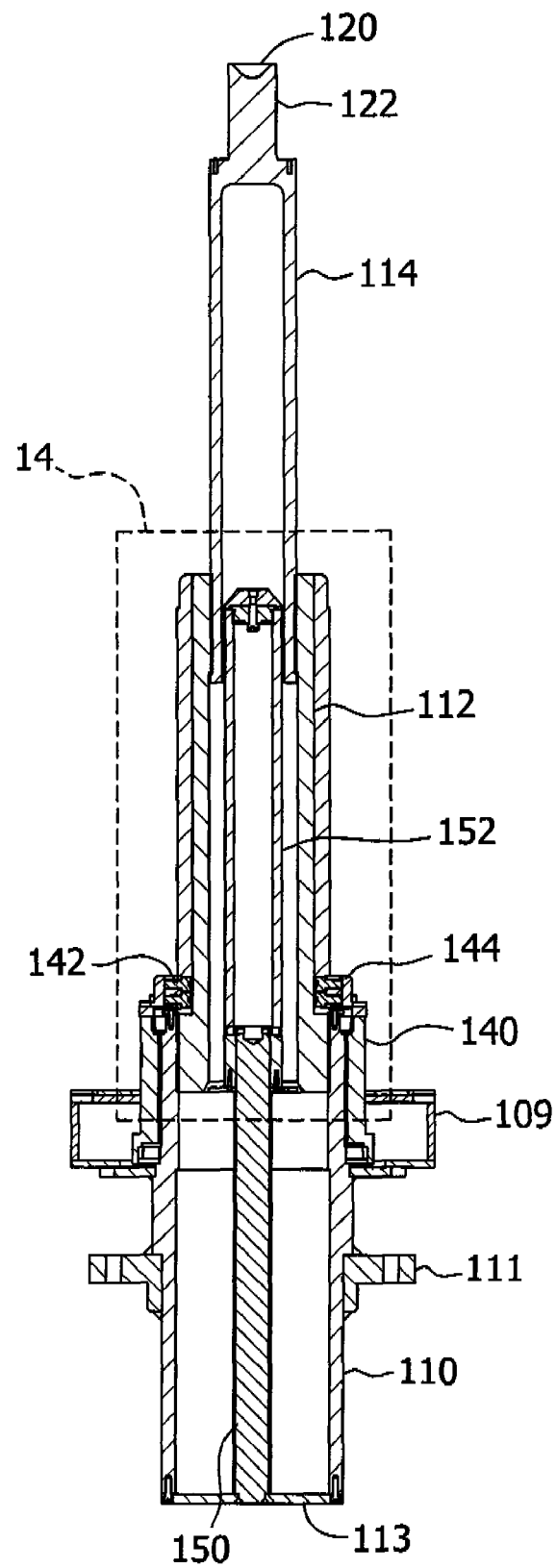
FIG. 13 is a cross-sectional view of the telescoping linear actuator of FIG. 12.
Figure 14:
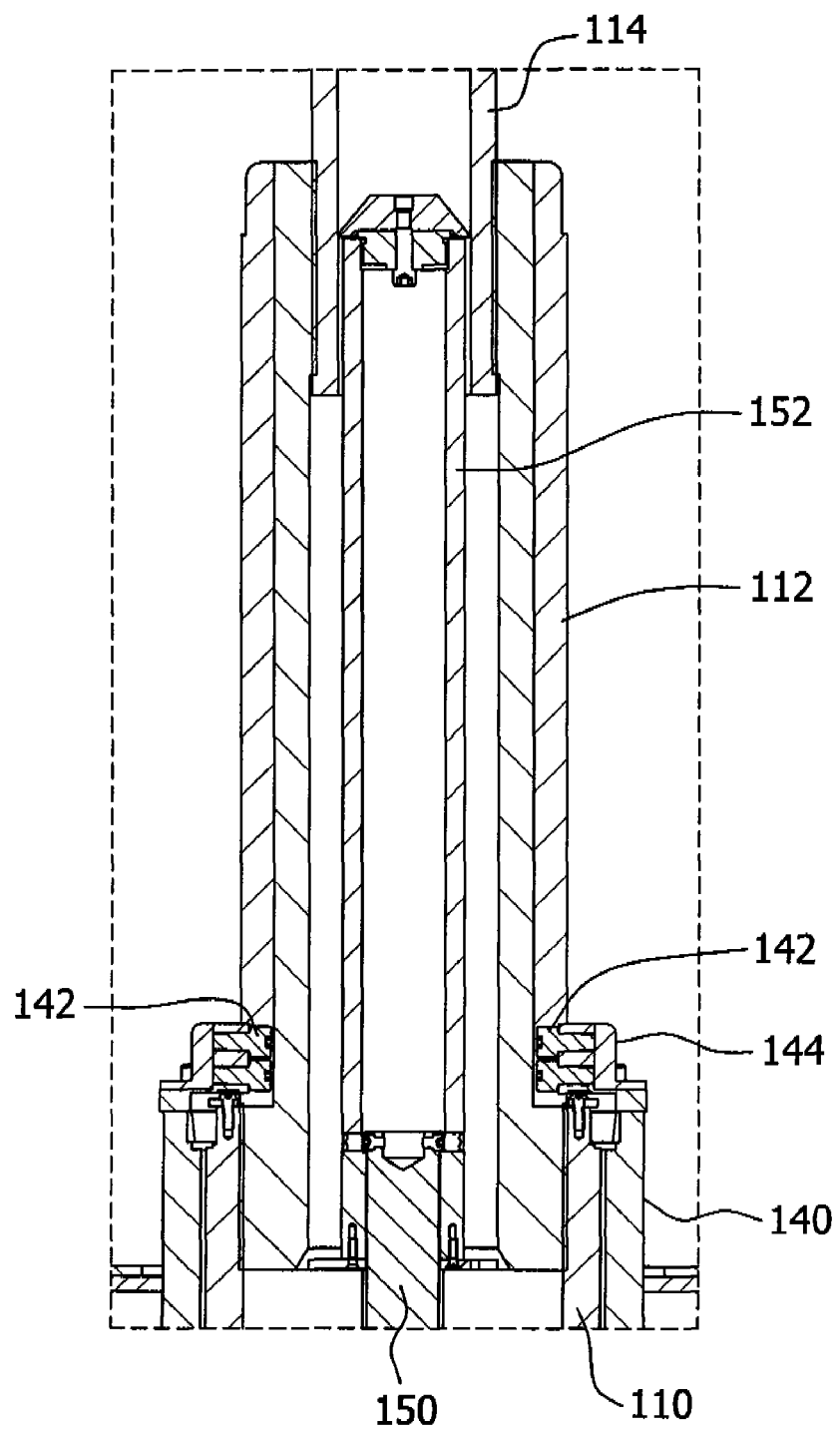
FIG. 14 is an expanded view of a portion of the actuator shown in FIG. 13.
Figure 15:
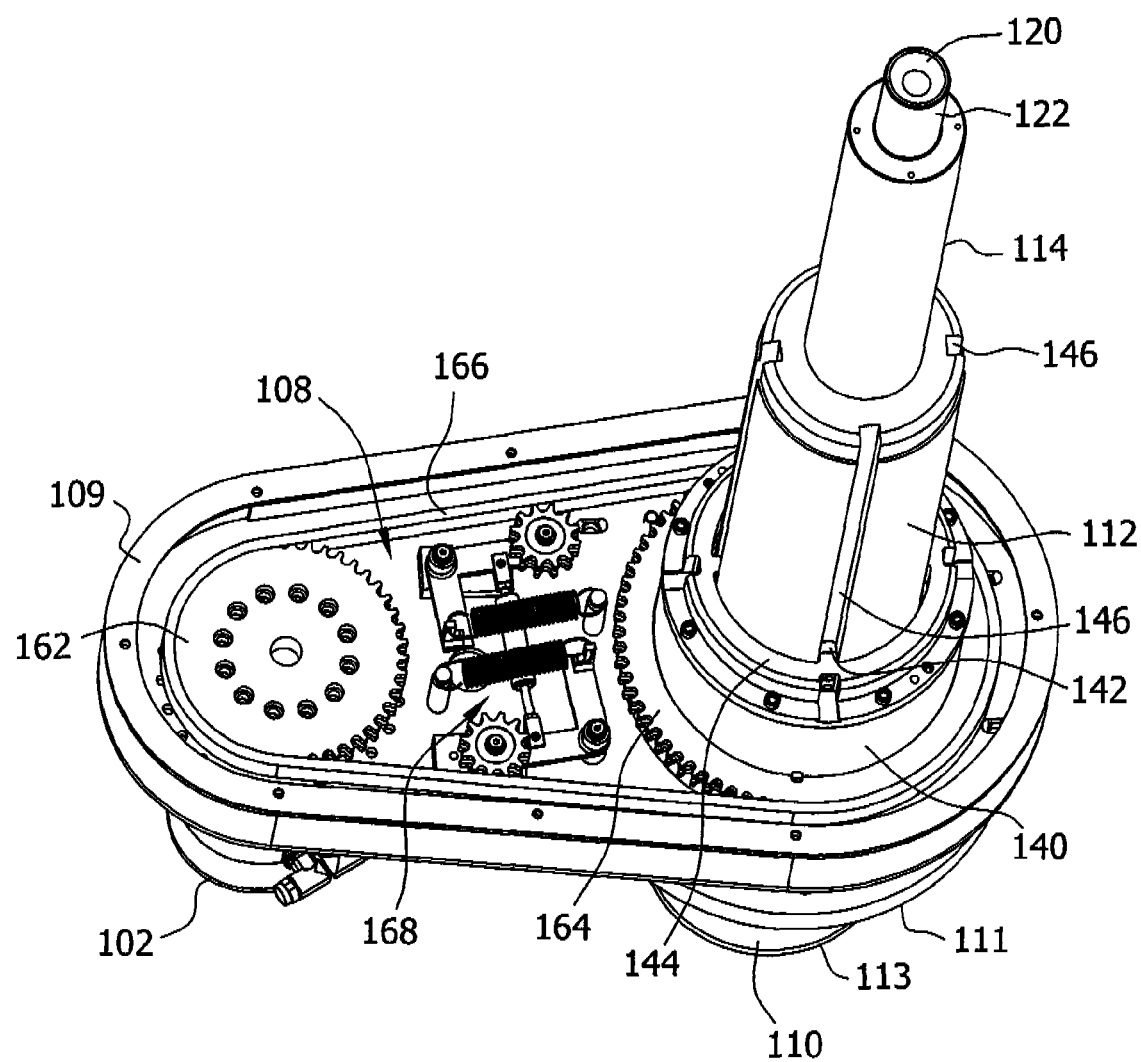
FIG. 15 is a perspective view of the telescoping linear actuator in an axially extended configuration with its top drive cover removed.
Figure 16:
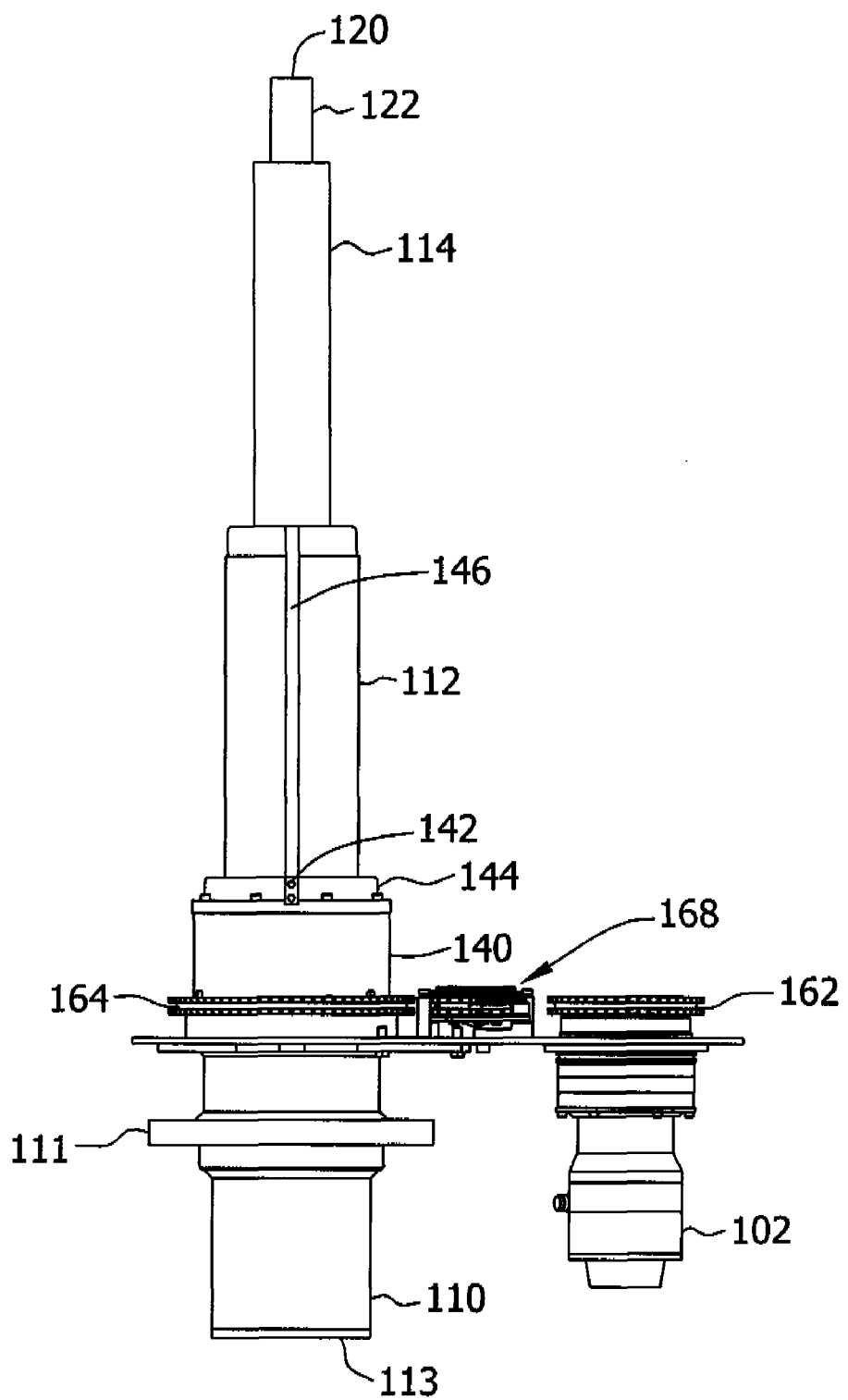
FIG. 16 is a side view of the telescoping linear actuator of FIG. 15.
Figure 17:
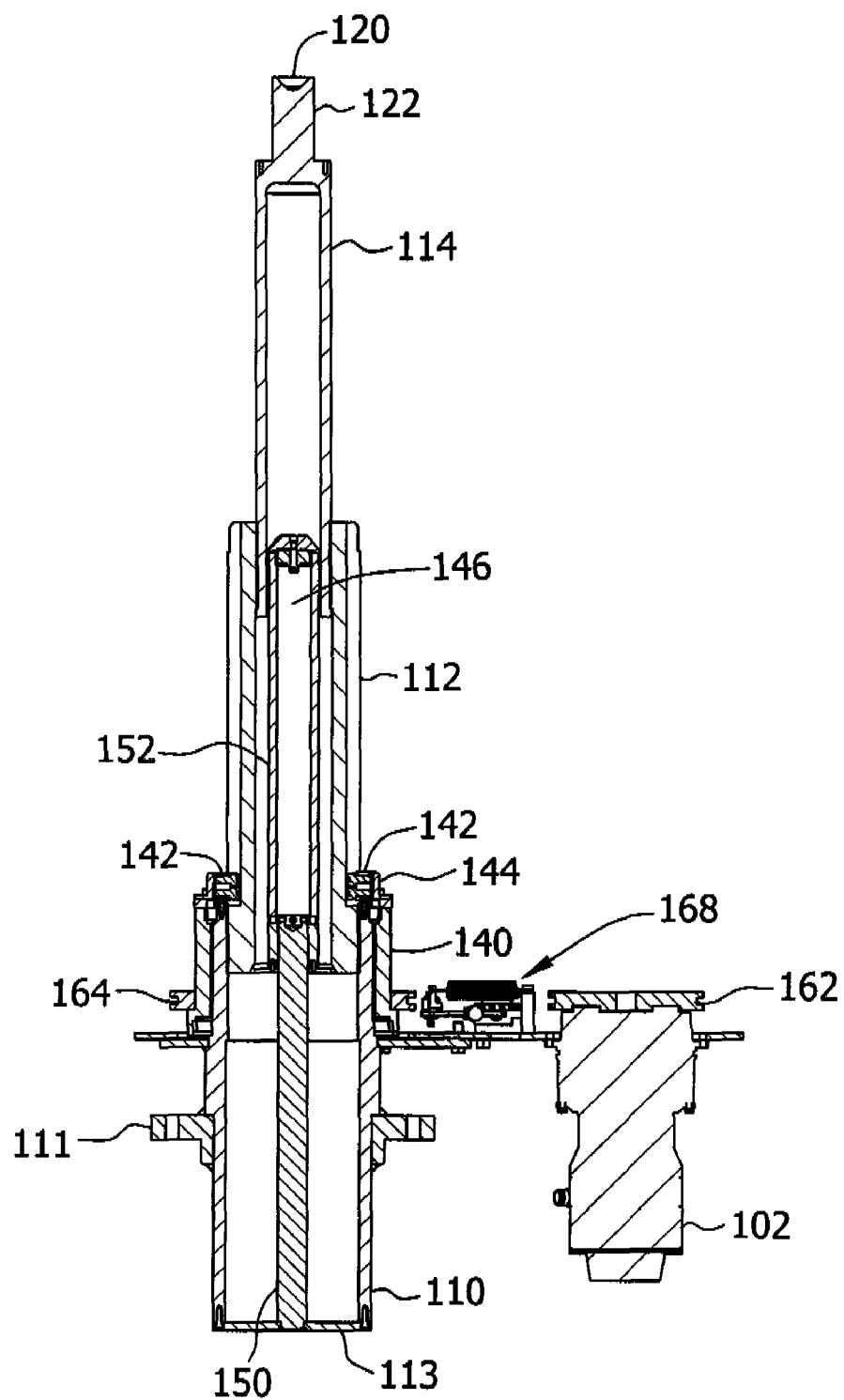
FIG. 17 is a cross-sectional view of the telescoping linear actuator of FIG. 16.
Figure 18:
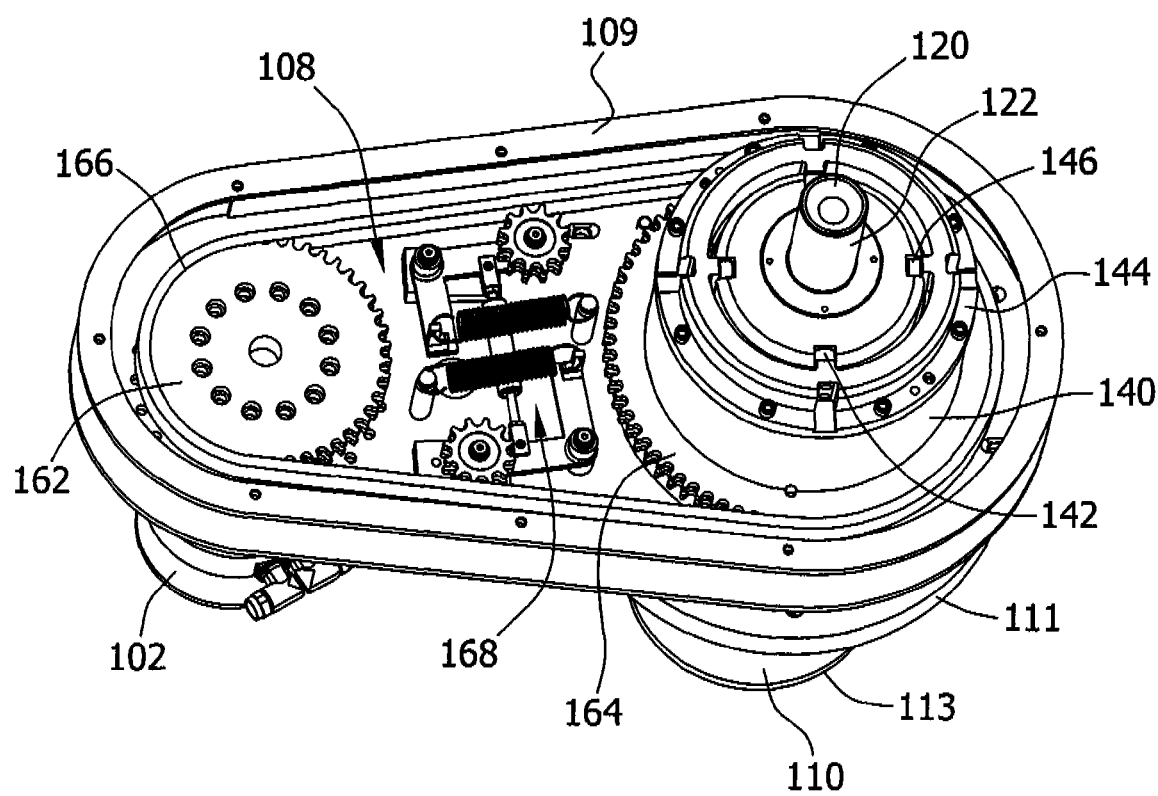
FIG. 18 is a perspective view of the telescoping linear actuator in an axially extended configuration with its top drive cover removed.
Figure 19:
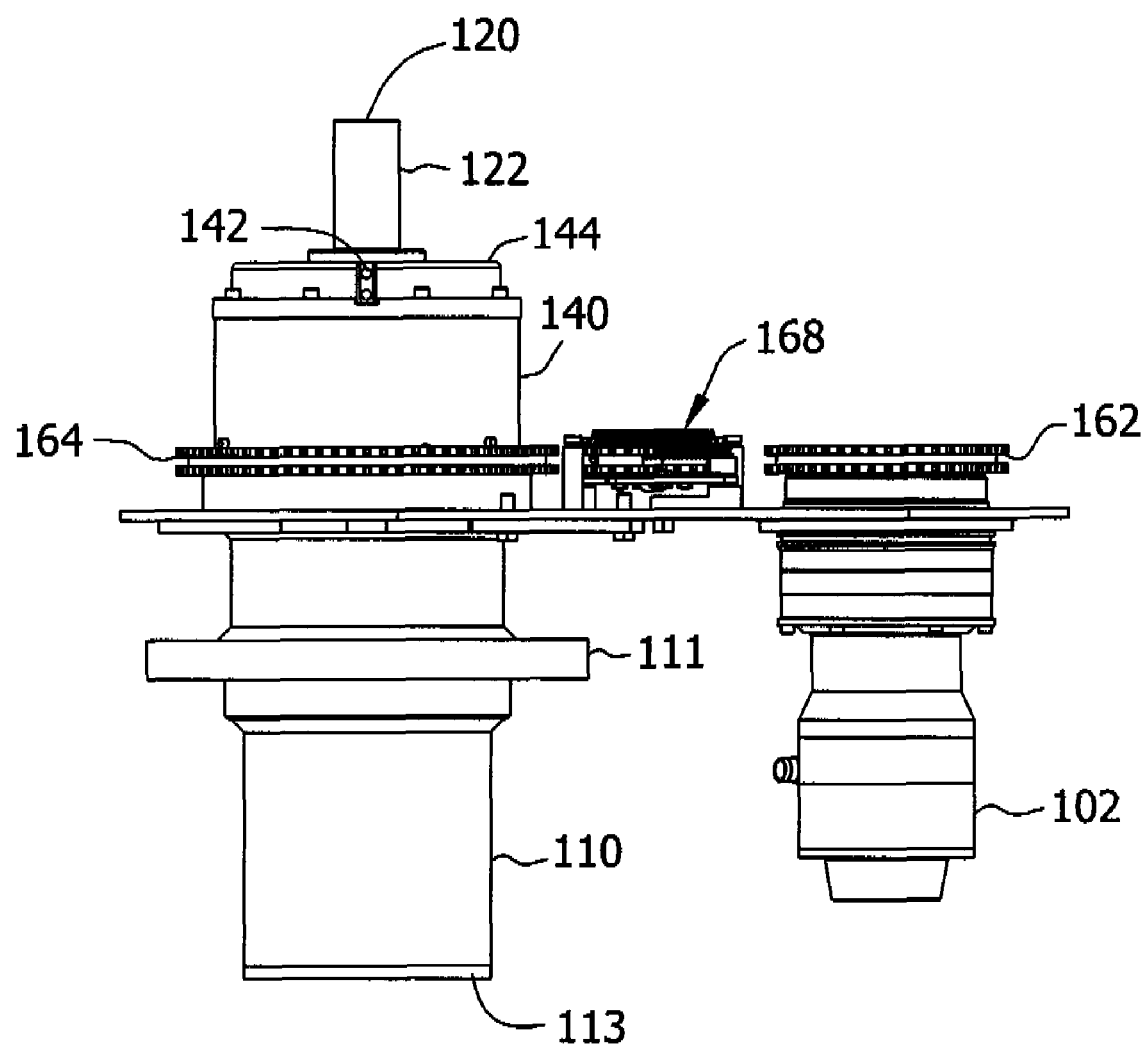
FIG. 19 is a side view of the telescoping linear actuator of FIG. 18.
Figure 20:
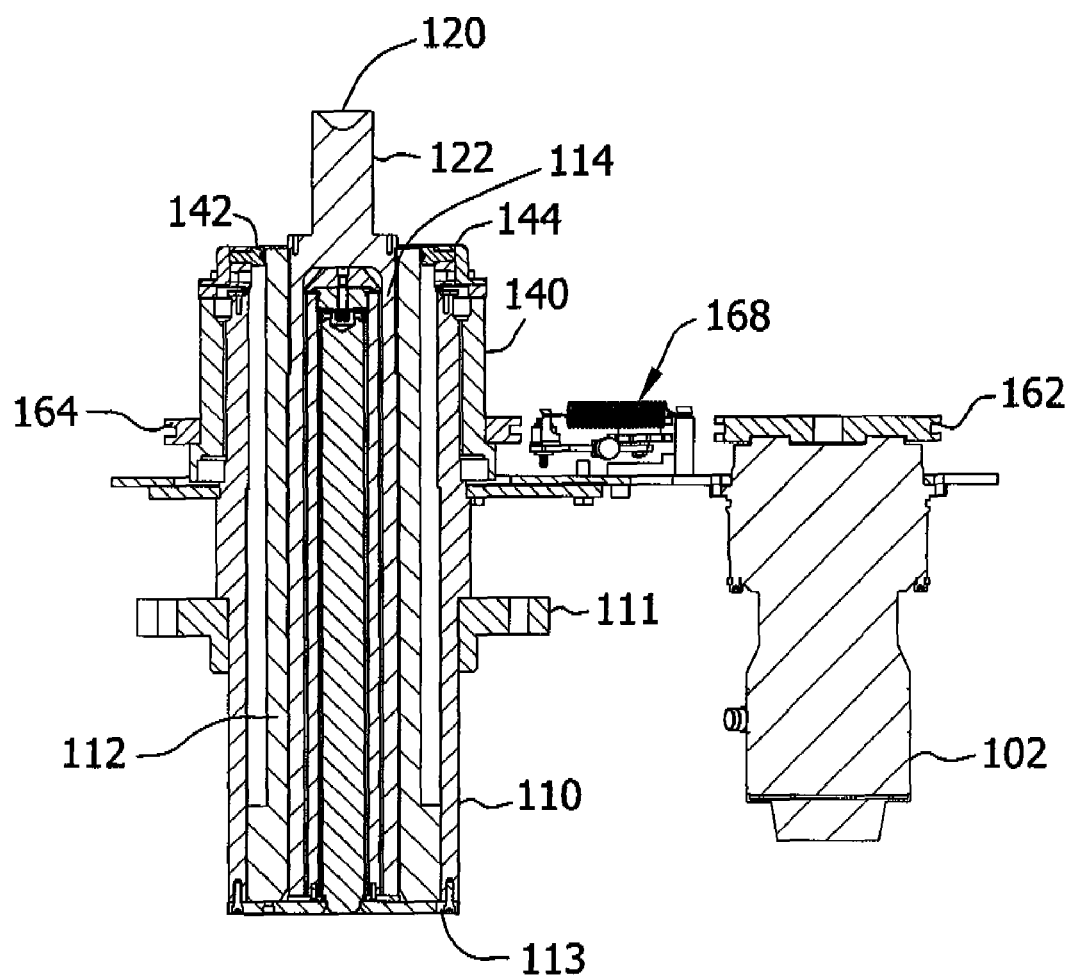
FIG. 20 is a cross-sectional view of the telescoping linear actuator of FIG. 19.
Figure 21:
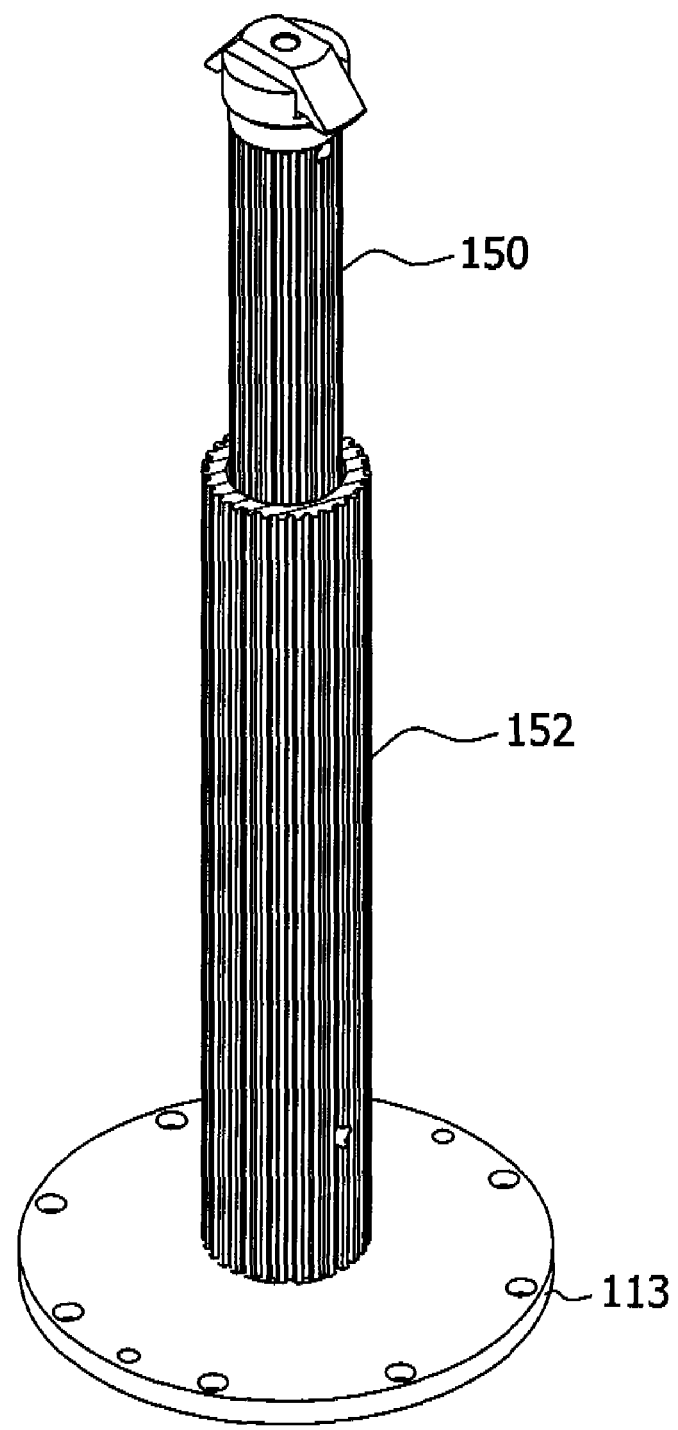
FIG. 21 is a perspective view of an internal locking system for use in the telescoping linear actuator of FIG. 8.
Figure 22:
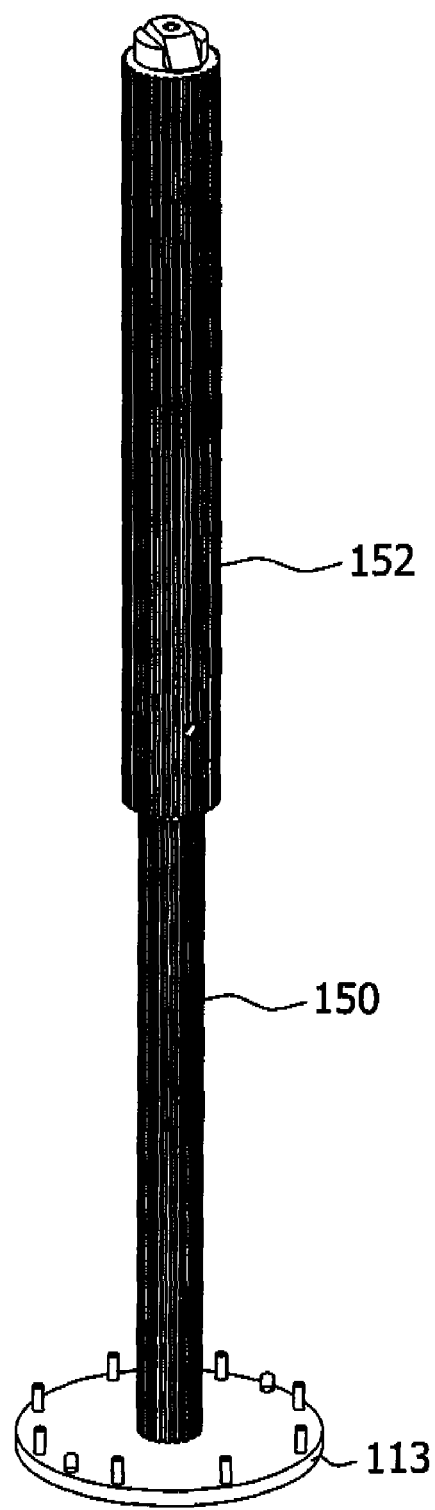
FIG. 22 is a perspective view of another embodiment of the internal locking system for use in the telescoping linear actuator of FIG. 8.

FIGS. 8-10 depict views of this embodiment of the actuator 100 in an unextended configuration, while FIGS. 11-14 depict corresponding views of the actuator 100 in an extended configuration. FIGS. 15-20 provide various cutaway and sectional views generally directed to the transmission system 108 and accompanying mechanisms. FIGS. 21 and 22 depict the telescoping, splined shafts positioned in the interior of the actuator in two different configurations.

Now referring to FIGS. 8-12, the second segment 112 includes axial slots 146 that extend from a distal end of the second segment (near the third segment 114) and terminate at a distance from a proximal end of the second segment (near the first segment 110). The proximal end of the second segment 112 is the end that is nearest the first segment 110 when the actuator 100 is in an extended configuration, while the distal end is that is nearest the third segment 114 when the actuator is in an extended configuration.

Surrounding the distal end of the second segment 112 when the actuator is an unextended configuration is a lower collar 140 and an upper collar 144. The lower collar 140 and upper collar 144 are suitably connected together by, for example, screws or bolts. Additionally, other embodiments may utilize a single collar, instead of distinct upper 144 and lower 140 collars. The collars 140 and 144 are confined to their position atop the first segment 110, and are constrained by suitable connection to the first segment to prevent axial displacement while still permitting rotation of the collars 140 and 144. The collars 140 and 144 are thus free to rotate relative to the first segment 110 but cannot move axially due to thrust bearings or other means confining the collars 140 and 144.

In some embodiments, the transmission system 108 is enclosed by the transmission system cover 109. A portion of the transmission system cover 109 is removed in FIGS. 18-20, thus permitting a clearer view of the transmission system 108. A segment sprocket 164 is placed along the outer diameter of the lower collar 144 and suitably connected thereto to transmit rotational energy from the segment sprocket to the lower collar. A chain 166 connects the segment sprocket 164 to a drive sprocket 162. The drive sprocket is in turn connected to the drive source 102. Tension mechanisms 168 maintain a required level of tension on the chain 166 to ensure effective operation. Other embodiments use different components in the transmission system 108. For example, a combination of belts and pulleys may be used to transmit rotational energy from the drive source 102 to the lower collar 140. A combination of gears and drive shafts may also be used for the same purpose. Specifically, the mechanism used to drive the lower collar 144 may be selected based on the weight of the load to be lifted and a desired rate of actuation.

Returning now to the collars 140 and 144, attached to an outer diameter of the lower collar 140 are segment sprockets 164. Cam followers 142 are connected along the circumference of the upper collar 144 and extend inwardly therein for mating with the axial slots 146 in the second segment 112. In the embodiment depicted in FIGS. 8-20, the cam followers 142 are positioned in vertical rows of two at four points along the circumference of the upper collar 144 at ninety degree intervals. Other embodiments may utilize different numbers or arrangements of cam followers 142. Furthermore, other mechanisms may be used to connect and subsequently transfer rotation motion from the upper collar 144 to the second segment 112. For example, keys or other low-friction devices may be placed within the upper collar 144 for engagement with the axial slots 146.

Accordingly, when the drive source 102 rotates, the drive sprocket 162 is rotated, causing the chain 166 to be driven and subsequently rotate the segment sprocket 164. Rotation of the segment sprocket 164 forces the collars 140 and 144 to rotate as well. Rotation of the upper collar 144 in turn causes the second segment 112 to rotate as well by rotating the cam followers 142. The cam followers 142 are engaged in the axial slots 146, as described above, and their rotation causes the second segment 112 to rotate. The first 110 and third 114 segments are then driven apart in the same manner as the first embodiment described above, i.e. the segments are operatively connected by corresponding sets of threads.

In one embodiment, the first 110 and second 112 segments have a minimum engagement (i.e., overlap) that is determined by the termination of the axial slots 146. The minimum engagement of the second 112 and third 114 segments is based on a thread count and a maximum number of rotations of the second segment.

In one embodiment, an encoder is provided on the motor or at another position within the transmission system 108 to provide feedback regarding a position of the load being lifted by the actuator 100. The position of the load being lifted by actuator 100 is calculated in the same manner as described above with respect to the first embodiment. Additionally, the encoder may be connected to any portion of the transmission system 108 to measure rotational displacement and need not be connected to the drive source 102.

The actuator 100 illustrated in FIGS. 8-22 includes a base plate 113 and an inner spline shaft 150 (i.e., a shaft or inner shaft or inner torque shaft) that are coupled together and attached to the first segment 110, wherein the first segment is attached to the base of the actuator. In one embodiment, the base plate 113 is inserted last in assembly and is easily removed for inspection or lubrication of the actuator 100. An outer spline shaft 152 (i.e., an outer shaft or outer torque shaft) is axially aligned with the inner spline shaft 150 and telescoping arrangement therewith. Together, the spline shafts 150 and 152 form another embodiment of the locking system. In some embodiments, the outer spline shaft 152 is formed integrally within the interior diameter of the third segment 114.

The arrangement of the spline shafts 150 and 152 and the base plate 113 is best shown in FIGS. 21 and 22. In the exemplary embodiment depicted in FIG. 21, the splines formed in the outer diameter of the inner spline shaft 150 (i.e., a first locking member) mate with the splines formed in the inner diameter of the outer spline shaft 152 (i.e., a second locking member), thus preventing rotation of the inner spline shaft relative to the outer spline shaft. Together, the splines formed in the outer diameter of the inner spline shaft 150 and the splines formed in the inner diameter of the outer spline 152 comprise a locking system.

Accordingly, the telescoping spline shafts 150 and 152 and the third segment 114 cannot rotate as the second segment 112 is driven by the drive source 102. The outer spline shaft 152 floats up and down on the inner spline shaft 150, but does not rotate or become removed from the third segment 114.

At least a portion of the outer spline shaft 152 is fastened to the third segment 114 by any suitable connection that restricts their rotation relative to each other. In some embodiments, the outer spline shaft 152 is engaged with the third segment 114 through corresponding sets of splines formed in the outer diameter of the outer spline shaft and an inner diameter of the third segment (i.e., a third locking member and a fourth locking member), in a similar manner as the outer spline shaft and the inner spline shaft 150. Together, the corresponding sets of splines (i.e., the third locking member and the fourth locking member) form a second locking system.

In other embodiments, instead of utilizing the inner spline shaft 150 and outer spline shaft 152, a single telescoping shaft is used in their place. The telescoping shaft may include a plurality of sections, with each inhibited from rotating relative to the other by any suitable mechanism (e.g., splines, keys, etc). One end of the telescoping shaft is suitably fixed to a portion of the base plate 113, and the other end is suitable in engagement with the third segment 114 through any of the mechanisms described above.

In the embodiments illustrated in FIGS. 1-22, the actuator has a greater volumetric efficiency in the collapsed state, in comparison to known actuators. Accordingly, the present invention provides a greater load bearing capacity in less space than known actuators. Further, an improved stroke per collapsed length is provided, in comparison to known actuators.

The above-described embodiments are exemplary in nature, and should not be construed to be limiting. Presented below are additional alternative embodiments that are contemplated within the scope of the invention.

While specific mention has been made to actuators with three segments and one drive source, other configurations are contemplated as well. For example, multiple segments may be added concentrically, thus increasing the radius of the actuator. By increasing the radius of the actuator, its lateral load bearing capacity increases as well. This particularly useful in systems where multiple actuators are used together to position a large load.

In other embodiments, multiple segments may be added to the actuator, in effect stacking the actuators on top of one another. Each motor driven segment is optionally connected to the telescoping torque tube arrangement with a freely rotating bearing such that the motor driven segment assists in extending or retracting the telescoping torque tube arrangement axially. In one embodiment, the exterior telescoping tubular cover (i.e., torque tube) arrangement includes an equal number of tubular covers and actuator segments and a freely rotating bearing between the driven segments and their respective tubular covers. In another embodiment, the actuator assembly includes multiple sets of driven segments and a plurality of motors that may or may not be equal in number to the number of sets of driven segments. In one embodiment, the motors are connected directly to their respective segments and move along with the segments. In another embodiment, the motors are connected to their respective segments with telescoping arrangements as described above.

In some embodiments, the actuator assembly or segment set is hollow down its center and includes at least one similar, possibly hollow, actuator or segment set that occupies the hollow space. In one embodiment, all such actuators or segment sets are connected together and act as a single, multiple segment actuator. In another embodiment subsets of single or multiple segment actuators or segment sets act independently for precise positioning of multiple concentric loads.

In other embodiments, the actuator assembly includes multiple sets of segments, a plurality of motor driven segments, and a plurality of surrounding segments that are prevented from rotation. As each set is driven apart or driven together the sets act together as a single actuator.

In the exemplary embodiment, the actuator assembly or segment set is hollow down its center with at least one similar, possibly hollow, actuator or segment set occupying this hollow space. In one embodiment, all such actuators or segment sets are connected together and act as a single, multiple segment actuator. In another embodiment, subsets of single or multiple segment actuators or segment sets act independently for precise positioning of multiple concentric loads.

In one embodiment, the actuator assembly includes multiple sets of segments, a plurality of motor driven segments, and a plurality of surrounding segments that are prevented from rotation. As each set is driven apart or driven together the sets act together as a single actuator. In the exemplary embodiment, the actuator assembly includes one motor. In another embodiment, the actuator assembly includes multiple sets of driven segments and a plurality of motors that may or may not be equal in number to the number of sets of driven segments. In one embodiment, the motors are connected directly to their respective segments and move along with the segments. In another embodiment, the motors are connected to their respective segments with telescoping arrangements as described above.

Exemplary embodiments of systems and methods for fabricating a telescoping actuator are described above in detail. The systems and methods illustrated are not limited to the specific embodiments described herein, but rather, components of the system may be utilized independently and separately from other components described herein. Further, steps described in the method may be utilized independently and separately from other steps described herein. While the invention has been described in terms of various specific embodiments, it will be recognized that the invention can be practiced with modification within the spirit and scope of the claims.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

What is claimed is:

1. A telescoping linear actuator comprising:
a first segment comprising a housing and an inner spline shaft;
a second segment having axial slots;
an outer spline shaft coaxial with said inner spline shaft, said outer spline shaft being tubular and receiving at least a portion of said inner spline shaft therein for telescoping movement of said outer spline shaft relative to said inner spline shaft;
a locking system locking said outer spline shaft against rotation relative to said inner spline shaft;
a third segment engaged with said outer spline shaft, said first segment and said third segment in coaxial relationship with said second segment and configured for telescoping axial movement relative to one another upon rotation of said second segment;
a collar surrounding a portion of said second segment, said collar connected to said first segment to prevent axial displacement of said collar while still permitting rotation of said collar relative to said first segment;
a cam follower connected to said collar and configured for mating with the axial slots of said second segment; and
a drive source connected to said collar to rotate said collar, wherein rotation of said collar causes movement of said cam follower and movement of said cam follower causes rotation of second segment.

2. The telescoping linear actuator of claim 1 wherein said locking system comprises a first locking member disposed on said inner spline shaft and a second locking member disposed on said outer spline shaft for contact with said first locking member to inhibit rotation of said third segment relative to said first segment.

3. The telescoping linear actuator of claim 2 wherein said inner spline shaft has an outer surface and said outer spline shaft has an inner surface, said first locking member comprising at least one spline on the outer surface of said inner spline shaft, said second locking member comprising at least one spline on the inner surface of said outer spline shaft engageable with said at least one spline on the outer surface of said inner spline shaft to inhibit rotation of said third segment relative to said first segment.

4. The telescoping linear actuator of claim 3 wherein said third segment is tubular and configured to receive at least a portion of said outer spline shaft therein, said third segment capable of telescoping movement relative to said outer spline shaft.

5. The telescoping linear actuator of claim 4 wherein the said third segment is engaged with said outer spline shaft by a second locking system locking said outer spline shaft against rotation relative to said third segment.

6. The telescoping linear actuator of claim 5 wherein said second locking system comprises a third locking member disposed on said outer spline shaft and a fourth locking member disposed on said third segment for contact with said third locking member disposed on said outer spline shaft to inhibit rotation of said third segment relative to said outer spline shaft.

7. The telescoping linear actuator of claim 1 wherein said third segment is in threaded engagement with said second segment to operatively connect said third segment with said second segment, and wherein said second segment is in threaded engagement with said first segment to operatively connect said second segment with said first segment.

8. The telescoping linear actuator of claim 7 wherein the threaded engagement of said third segment and said second segment and the threaded engagement of said second segment and said first segment is operable to permit telescoping axial movement of said first segment relative to said third segment upon rotation of said second segment.

9. A linear actuator configurable between an unextended configuration and an axially extended configuration, said actuator comprising:
a first longitudinal segment, a second longitudinal segment, and a third longitudinal segment, said longitudinal segments being in coaxial relationship with one another and configured for telescoping axial movement relative to one another;
a collar surrounding a portion of said second segment, said collar connected to said first segment to prevent axial displacement of said collar while still permitting rotation of said collar relative to said first segment;
a cam follower connected to said collar and configured for mating with said second segment, wherein rotation of said collar by a drive source causes movement of said cam follower and movement of said cam follower causes rotation of said second segment;
said second segment operable to cause telescoping axial movement of said second segment relative to said first segment, said third segment also operatively connected to said second segment for telescoping axial movement of said third segment relative to said first and second segments in response to rotation of said second segment; and
a locking system connecting said third segment with said first segment to inhibit rotation of said third segment relative to said first segment while permitting telescoping axial movement of said third segment relative to said first and second segments.

10. The actuator of claim 9 wherein the actuator has an exterior and an interior, said locking system connecting said third segment to said first segment within the interior of the actuator.

11. The actuator of claim 10 wherein said first segment comprises: a tubular housing having an inner surface at least in part defining the interior of the actuator; and a shaft disposed within the interior of said housing and connected thereto such that both said housing and said shaft are together fixed against axial movement and rotation, said shaft being spaced from the inner surface of the housing; said third segment being tubular and receiving at least a portion of said shaft therein, said locking system connecting said third segment to said shaft to inhibit rotation of said third segment relative to said first segment while permitting telescoping axial movement of said third segment relative to said first and second segments upon rotation of said second segment.

12. The actuator of claim 11 wherein said shaft is a telescoping shaft configurable between an unextended configuration and an extended configuration.

13. The actuator of claim 12 wherein said locking system comprises a first locking member disposed on said shaft and a second locking member disposed on said third segment for contact with said first locking member to inhibit rotation of said third segment relative to said first segment.

14. The actuator of claim 13 wherein said shaft has an outer surface and the tubular third segment has an inner surface, said first locking member comprising at least one spline on the outer surface of said shaft, said second locking member comprising at least one spline on the inner surface of said third segment engageable with the at least one spline on the outer surface of said shaft to inhibit rotation of said third segment relative to said first segment.

* * * * *